US 9,930,565 B2

(12) United States Patent
Maekawa et al.

(10) Patent No.: US 9,930,565 B2
(45) Date of Patent: Mar. 27, 2018

(54) CONTROLLING APPARATUS FOR COMMUNICATION-QUALITY MEASURING, COMMUNICATION APPARATUS, AND PROGRAM

(71) Applicant: NEURONET Inc., Machida-shi, Tokyo (JP)

(72) Inventors: Hirofumi Maekawa, Machida (JP); Hidekazu Kubota, Machida (JP)

(73) Assignee: NEURONET INC., Machida-Shi, Tokyo (JP)

( * ) Notice: Subject to any disclaimer, the term of this patent is extended or adjusted under 35 U.S.C. 154(b) by 118 days.

(21) Appl. No.: 14/848,488

(22) Filed: Sep. 9, 2015

(65) Prior Publication Data
US 2015/0382232 A1 Dec. 31, 2015

Related U.S. Application Data

(63) Continuation of application No. PCT/JP2013/073421, filed on Aug. 30, 2013.

(51) Int. Cl.
*H04L 29/08* (2006.01)
*H04W 28/02* (2009.01)
(Continued)

(52) U.S. Cl.
CPC ......... *H04W 28/0284* (2013.01); *G01P 15/00* (2013.01); *G01S 19/01* (2013.01);
(Continued)

(58) Field of Classification Search
CPC ......... H04W 28/0284; H04W 28/0236; H04W 28/08; H04W 28/0226; H04W 24/06;
(Continued)

(56) References Cited

U.S. PATENT DOCUMENTS 7,142,512 B1* 11/2006 Kobayashi .......... H04L 41/5019
370/232
7,280,835 B2* 10/2007 Usuda .................... G01S 11/06
455/403
(Continued)

FOREIGN PATENT DOCUMENTS

JP  2004-364169 A   12/2004
JP     4498973 B    11/2006
(Continued)

OTHER PUBLICATIONS

Shunsuke Doi, Noburo Takagi, Shuuichi Sakao, Shigeya Okamoto, Toshimasa Ikura, "B-6-5, The Result of Speed Test Site on Broadband Access Line," collection of Lectures and Transactions in Institute of Electronics, Information, and Communication Engineers (IEICE) General Conference, IEICE, Feb. 28, 2011, vol. 2, Paragraph 5. Original and English translation included.

*Primary Examiner* — Andrew Lai
*Assistant Examiner* — Chuong M Nguyen
(74) *Attorney, Agent, or Firm* — Nath, Goldberg & Meyer; Jerald L. Meyer; Stanley N. Protigal

(57) ABSTRACT

It is an objective of the present disclosure to provide a controlling apparatus for communication-quality measuring which suppresses a reduction of a service communication quality in measurement of a communication quality through data transfer. A communication apparatus 100 is provided with a controlling apparatus for communication-quality measuring 102 that includes a communication-quality measuring unit 106 performing the data transfer with a communication load at a predetermined repetition to measure a communication quality value, a measurement-environment memory 107 storing the communication quality value, a measurement-environment monitor 108 monitoring a change in the stored value in the measurement-environment
(Continued)

memory 107, and a measurement-load controlling unit 109 changing the communication load according to the change in stored value.

12 Claims, 19 Drawing Sheets

(51) Int. Cl.
| | |
|---|---|
| *H04W 24/06* | (2009.01) |
| *G01P 15/00* | (2006.01) |
| *G01S 19/01* | (2010.01) |
| *H04W 28/08* | (2009.01) |
| *H04L 12/26* | (2006.01) |
| *H04W 28/22* | (2009.01) |
| *H04L 12/805* | (2013.01) |
| *H04L 12/801* | (2013.01) |
| *H04L 12/841* | (2013.01) |

(52) U.S. Cl.
CPC ........ *H04L 43/0852* (2013.01); *H04L 67/322* (2013.01); *H04W 24/06* (2013.01); *H04W 28/0226* (2013.01); *H04W 28/0236* (2013.01); *H04W 28/08* (2013.01); *H04L 47/11* (2013.01); *H04L 47/28* (2013.01); *H04L 47/36* (2013.01); *H04W 28/22* (2013.01)

(58) Field of Classification Search
CPC .... H04W 28/22; H04L 43/0888; G01S 19/01; G01P 15/00
See application file for complete search history.

(56) References Cited

U.S. PATENT DOCUMENTS

| | | | | |
|---|---|---|---|---|
| 8,570,895 | B2* | 10/2013 | Tanaka | H04W 36/14 370/252 |
| 9,414,288 | B2* | 8/2016 | Chang | H04W 36/0083 |
| 2013/0035115 | A1* | 2/2013 | Lindegren | H04W 28/22 455/456.3 |
| 2014/0357297 | A1* | 12/2014 | Futaki | H04W 24/10 455/456.1 |
| 2015/0009848 | A1* | 1/2015 | Miki | H04W 72/1231 370/252 |

FOREIGN PATENT DOCUMENTS

| | | | |
|---|---|---|---|
| JP | 2007-067926 A | 3/2007 | |
| JP | 2011-515873 A | 5/2011 | |
| JP | 2011-151738 A | 8/2011 | |
| WO | WO 2004056123 A8 * | 8/2004 | ....... H04N 21/26216 |

* cited by examiner

| UPSTREAM MEASUREMENT DATA SIZE (KILOBYTE) | DOWNSTREAM MEASUREMENT DATA SIZE (KILOBYTE) |
|---|---|
| 100 | 200 |

*FIG. 6*

| COUNTER FOR NUMBER OF TRANSMI-SSIONS | UPSTREAM MEASUREMENT DATA TRANSMITTING TIME T1 (EPOCH-MILLISECOND) | UPSTREAM RESPONSE DATA RECEIVING TIME T2 (EPOCH-MILLISECOND) |
|---|---|---|
| 1 | 1371718023410 | 1371718023430 |
| 2 | 1371718024310 | 1371718024412 |
| . | | |
| . | | |
| N | | |

*FIG. 7*

| COUNTER FOR NUMBER OF TRANSMI- SSIONS | DOWNSTREAM MEASUREMENT DATA TRANSMITTING TIME T3 (EPOCH-MILLISECOND) | DOWNSTREAM RESPONSE DATA RECEIVING TIME T4 (EPOCH-MILLISECOND) |
|---|---|---|
| 1 | 1371728023413 | 1371728023435 |
| 2 | 1371728024317 | 1371728024418 |
| . | | |
| . | | |
| N | | |

*FIG. 9*

UPSTREAM LINE SPEED

| TIME (EPOCH-MILLISECOND) | VALUE (kbps) |
|---|---|
| 137172024418 | 510 |
| 137172024410 | 405 |
| ... | |

UPSTREAM LATENCY

| TIME (EPOCH-MILLISECOND) | VALUE (MILLI-SECOND) |
|---|---|
| 137172024418 | 40 |
| 137172024410 | 38 |
| ... | |

*FIG. 10*

CONTROLLING APPARATUS FOR COMMUNICATION-QUALITY MEASURING, COMMUNICATION APPARATUS, AND PROGRAM

CROSS-REFERENCE TO RELATED APPLICATIONS

This application is a Continuation of PCT Application No. PCT/JP2013/073421, filed on Aug. 30, 2013, the entire contents of which are incorporated herein by reference.

TECHNICAL FIELD

The present disclosure relates to an apparatus to control the communication quality measurement of a communication apparatus, a communication apparatus including the same, and, a program.

BACKGROUND ART

In recent years, ubiquitous communications is provided with mobile terminal such as a laptop PC or a smart phone and a wireless network, such communications are becoming popular.

In addition, recent mobile terminals normally include a camera and a microphone, and also have a media processing function. Hence, a demand for communication services with multimedia information, such as videos and sound, which need a fast line speed are increasing.

Communication quality of a stationary communication, that is not a ubiquitous, is provided with such as an installed desktop PC and a wired LAN connection, such communication has little change in comparison with that of a ubiquitous communication.

Conversely, in the case of ubiquitous communication, failures, such as a communication delay and a communication disruption, due to a change in communication speed, radio wave condition, etc., originating from a change in location where the communication is utilized suddenly occur. In particular, this becomes a considerable problem that disturbs a smooth communication in multimedia information communication services with a high real-time characteristic like a video conferencing.

In order to provide a stable service through ubiquitous communication, it is desirable to always measure a changing communication quality, and to control a service communication based on the measurement result, thereby suppressing a failure.

When, for example, it becomes clear that, in a video conference service, the currently available upstream line speed is slower than the transmitting speed of currently transmitted video streams upon measurement of the communication quality, by decreasing the transmitting speed of video streams, failures, such as a transmission delay and frame dropping, are suppressible.

As an example conventional technology of measuring a communication quality in ubiquitous communication, and controlling the service communication, a scheme of utilizing a measurement result of the communication quality in the physical layer in an OSI reference model has been known.

For example, Patent Document 1 discloses an apparatus that changes a communication parameter with another communication apparatus based on the radio wave intensity in wireless communication.

As another example conventional technology of measuring a communication quality in ubiquitous communication, a scheme of measuring the communication quality in a transport layer has been also known, and this technology is applied in speed measuring sites over the Internet (see Non-patent Document 1). The speed measuring site is a website which measures, based on a result of data transfer between the PC of a user and the server of the speed measuring site, a line speed of a network to which the user is connected, and presents the measurement result to the user. According to typical speed measuring sites, a line speed is calculated based on the data size of a TCP payload transferred between the PC of the user and the server of the speed measuring site, and, a time needed for the transfer.

The data transfer to measure a communication quality in the transport layer and the data transfer for a service like video streaming have different characteristics. The data transfer to measure the communication quality attempts to transfer data with a large communication load in order to check the maximum communication quality. In contrast, the data transfer for the service does not always need the maximum communication quality.

When, for example, the communication terminal of the user has only the performance of decoding video streaming with a small data size, it is desirable not to receive video streaming with a large data size even if the line speed has leeway. Conversely, when the same terminal has the sufficient performance of decoding sound streaming, it is fine if the sound streaming is received at a fast speed by utilizing the maximum communication quality.

RELATED TECHNICAL DOCUMENTS

Patent Documents

Patent Document 1: Japan Patent No. 4498973
Non-patent Document 1: Shunsuke DOI, Noburo TAKAGI, Shuuichi SAKAO, Shigeya OKAMOTO, Toshimasa IKURA, "B-6-5, The Result of Speed Test Site on Broadband Access Line", collection of Lectures and Transactions in Institute of Electronics, Information, and Communication Engineers (IEICE) General Conference, IEICE, Feb. 28, 2011, Vol. 2, Paragraph. 5

SUMMARY OF INVENTION

Technical Problem

The communication quality measurement in the physical layer according to above conventional technology measures only the communication quality in the physical layer directly connected with a communication apparatus. Hence, there is a disadvantage that, for services over the Internet which typically transfer data through plural physical layer connections, only a partial measurement result is possible.

In the case of, for example, a service in which a wireless communication terminal is a data transmission originator and a server over a cloud network is the final transmission destination, data is transferred through, in addition to a network between the wireless communication terminal and a radio wave base station, a network between the radio wave base station and the server over the cloud network. In this case, even if it is determined that the communication quality between the wireless communication terminal and the radio wave base station is excellent based on a radio wave intensity, when the communication quality of the network between the radio wave base station and the server over the cloud network is not excellent, the communication quality of the whole service becomes not excellent. Accordingly, if the communication quality up to the final transmission destination is not measured, a precise measurement result is not obtainable.

Conversely, the communication quality measurement that utilizes data transmission in the transport layer according to the above conventional technology enables a measurement of the communication quality between the transmission originator and the final transmission destination for data transfer. When, however, the communication quality is always measured through this scheme, there is a disadvantage that the data transfer for the communication quality measurement with a high communication load may decrease the service communication quality.

Therefore, it is an objective of the present disclosure to provide a controlling apparatus for communication quality measuring that can suppress a tendency in which a communication quality measurement through data transfer decreases a service communication quality, a communication apparatus including the same, and, a program.

Solution to Problem

In order to accomplish the above objective, a controlling apparatus for communication-quality measuring according to the present disclosure includes:

a communication-quality measuring unit measuring a value of communication quality of a communication apparatus by performing data transfer with a communication load at a predetermined repetition;

a measurement-environment memory storing the communication quality value;

a measurement-environment monitor monitoring a change in the communication quality value stored in the measurement-environment memory; and a measurement-load controlling unit changing the communication load according to the change in the communication quality value.

In addition, in order to accomplish the above objective, a communication apparatus according to the present disclosure includes, in addition to the above controlling apparatus for communication-quality measuring a resource measuring unit periodically measuring a communication resource available for the data transfer, in which:

the measurement-environment memory further stores a measured resource value measured by the resource measuring unit; and the measurement-load controlling unit changes the communication load according to the change in the communication quality value and a change in the measured resource value.

A computer may be caused to function as the above controlling apparatus for communication-quality measuring and communication apparatus by a program Advantageous Effects of Invention According to the present disclosure, it becomes possible to suppress that a measurement of the communication quality to control a service communication quality becomes a factor of reducing the service communication quality, and to always maximally utilize the communication resource for the service. Hence, a tendency of decreasing the service communication quality is suppressible. This is particularly beneficial for ubiquitous communications that have various communication environments changing from moment to moment.

BRIEF DESCRIPTION OF DRAWINGS

FIG. 6 is a diagram illustrating an example table utilized by a data-size memory in the communication apparatus according to an embodiment of the present disclosure;

FIG. 7 is a diagram illustrating an example table utilized by an upstream data temporal memory in the communication apparatus according to an embodiment of the present disclosure;

FIG. 9 is a diagram illustrating an example table utilized by a downstream data temporal memory in the communication apparatus according to an embodiment of the present disclosure;

FIG. 10 is a diagram illustrating an example table utilized by a measurement environment memory in in the communication apparatus according to an embodiment of the present disclosure;

DESCRIPTION OF EMBODIMENTS

An explanation will be given of an embodiment of the present disclosure with reference to the accompanying figures.

First Embodiment

Figure 1:
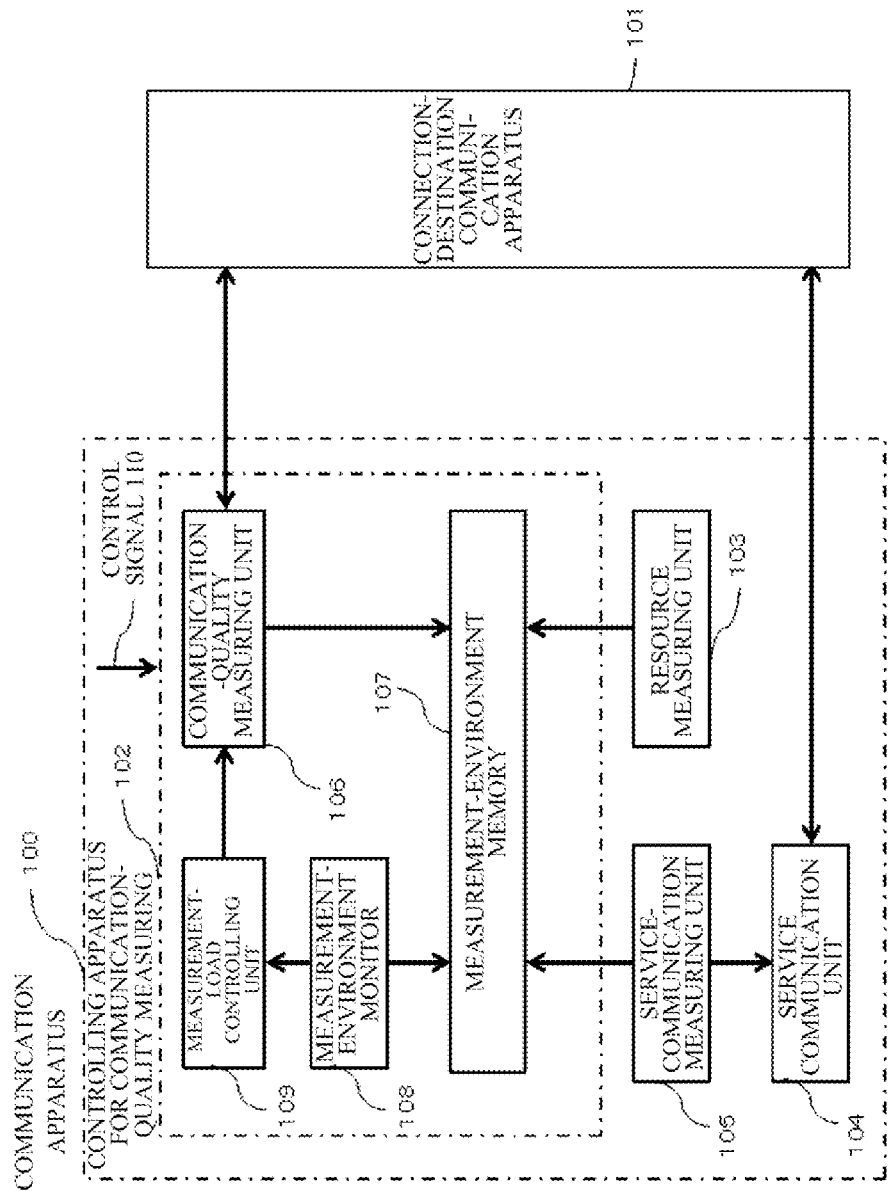
FIG. 1 is a schematic block diagram of a communication apparatus according to an embodiment of the present disclosure.

FIG. 1 is a schematic block diagram of a communication apparatus that utilizes a controlling apparatus for communication-quality measuring according to a first embodiment. A communication apparatus 100 includes a controlling apparatus for communication-quality measuring 102 that measures a communication quality with a connection-destination communication apparatus 101, a resource measuring unit 103 that measures a communication resource available for data transfer to measure a communication quality, a service communication unit 104 that transfers data with the connection-destination communication apparatus 101 for a service, and a service-communication measuring unit 105 that measures an amount of data transfer through the service communication unit 104.

The above communication apparatus 100 is realized by a computer that runs a program. This program is installed in a hard disk drive of the computer for use. In addition, this program may be stored in a DVD-ROM or a server and distributed.

An example communication apparatus 100 is a smartphone, a tablet computer, a mobile phone, a laptop computer, a desktop computer, or a portable gaming machine, and is an apparatus that includes a computer which is communicable with another apparatus via a network.

An example connection-destination communication apparatus 101 is a server, a smartphone, a tablet computer, a mobile phone, a laptop computer, a desktop computer, or a portable gaming machine, and is an apparatus that includes a computer which is communicable with another apparatus via the network.

The communication-quality measuring and controlling apparatus 102 includes a communication-quality measuring unit 106 that performs data transfer with a communication load at a predetermined cycle with the connection-destination communication apparatus 101, thereby measuring a communication quality value based on the amount of transfer and the time needed for the transfer, a measurement-environment memory 107 that stores the measured communication quality value, a measurement-environment monitor 108 that monitors a change in the stored value in the measurement-environment memory, a measurement-load controlling unit 109 that changes, according to the change in stored value, the communication load of the data transfer performed by the communication-quality measuring unit 106, thereby suppressing a reduction of the service communication quality, and, a control signal 110 that controls the activation of the controlling apparatus for communication-quality measuring 102 and the deactivation thereof.

The communication load means, in comparison with the maximum amount of transferable data per a unit time in a given network, the amount of data actually transferred per a unit time. The closer to the maximum the amount of data actually transferred per a unit time is, the higher the communication load is. For example, the larger the amount of data per a unit time of data transfer is, the higher the communication load becomes. In addition, the higher the execution cycle of the data transfer is, the higher the communication load becomes.

The resource measuring unit 103 measures at least one communication resource. The term communication resource indicates a factor that particularly affects the communication-quality measurement through data transfer performed by the communication-quality measuring unit 106, such as a physical condition of the communication apparatus and that of the network, the location of the communication apparatus, or the operation mode of the communication apparatus, among factors that affect the communication. An example communication resource is a radio wave intensity. In the case of a wireless communication, when the radio wave intensity is zero upon measurement thereof, a communication is disabled, and thus it becomes clear that the measuring process executed by the communication-quality measuring unit 10 may be once suspended. In addition to the radio wave intensity in the case of a wireless communication, the same is true of a signal intensity in the case of an infrared communication. Another example communication resource is a travelling status of the communication apparatus 100. When it is determined that the communication apparatus is travelling at a speed equal to or faster than a walking speed upon measurement of the travelling status of the location of the wireless communication apparatus, since the positional relationship with the base station and the obstacle changes, it is expected that the communication quality often and temporarily decreases, and thus the communication load of the data transfer performed by the communication-quality measuring unit 106 can be reduced beforehand. The resource measuring unit 103 stores, in the measurement-environment memory 107, the value of such a radio wave intensity and the determined value of such a travelling status as measured values for respective communication resources. The measurement-environment memory 107 stores, in addition to the value of the communication quality measured by the communication-quality measuring unit 106, the measured value of the radio wave intensity, etc. Like the change in measured value of the communication quality, the change in such a measured value is also monitored by the measurement-environment monitor 108.

The service communication unit 104 performs data transfer for a main service with the connection-destination communication apparatus 101. An example main service is image, video, sound data exchange, movie or music data exchange, game data exchange, other multimedia data exchange, or a Web conference service comprehensively covering those.

The service-communication measuring unit 105 measures the amount of data transfer performed by the service communication unit 104, and stores the measured value in the measurement-environment memory 107, thereby enabling a control for communication-quality measurement according to the kind of the service and the status thereof. Like the change in the measured value of the communication quality, the change in this measured value is also monitored by the measurement-environment monitor 108. For example, a Web conferencing covers plural kinds of data transfer services, such as video, sound, and picture, and, when, in particular, sound data transfer is important, a control is made so as to reduce the measurement load by the communication-quality measuring unit 106 when the amount of sound data transfer is larger than a predetermined value, thereby preferentially maintaining the sound quality.

As for the control by the controlling apparatus for communication-quality measuring 102 based on the control signal 110, when, for example, the communication apparatus 100 is a smartphone and the main service is Web conferencing, the control signal 110 that instructs an activation is input to the controlling apparatus for communication-quality measuring 102 when the user gives an operation to start the Web conferencing. Consequently, the controlling apparatus for communication-quality measuring 102 starts the activation. In addition, the control signal 110 that instructs a deactivation is input to the controlling apparatus for communication-quality measuring 102 when the user gives an operation to end the Web conferencing. Consequently, the controlling apparatus for communication-quality measuring 102 is deactivated.

Figure 2:
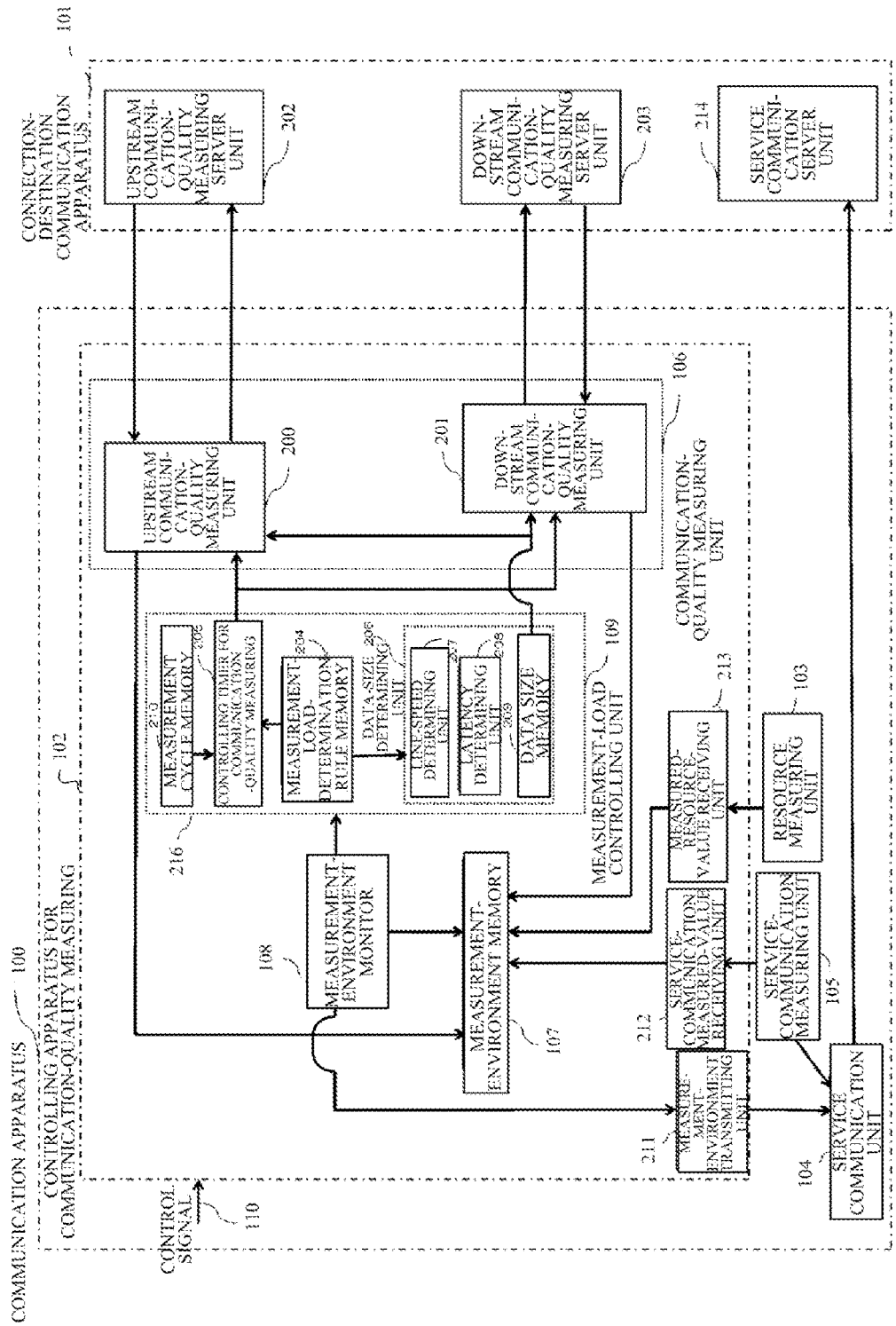
FIG. 2 is a detailed block diagram of a controlling apparatus for communication-quality measuring in the communication apparatus according to an embodiment of the present disclosure.

FIG. 2 is a detailed block diagram of the controlling apparatus for communication-quality measuring 102 of this embodiment. In general, an upstream communication and a downstream communication have different speeds, and thus the communication-quality measuring unit 106 includes an upstream communication-quality measuring unit 200 and a downstream communication-quality measuring unit 201 in order to measure the upstream line speed and the downstream line speed, individually. The upstream communication-quality measuring unit 200 performs data transfer with an upstream communication-quality measuring server unit 202 of the connection-destination communication apparatus 101 in order to measure the quality of an upstream communication with the communication apparatus 100 being as a transmission originator and the connection-destination communication apparatus 101 being as a transmission destination. The downstream communication-quality measuring unit 201 performs data transfer with a downstream communication-quality measuring server unit 203 of the connection-destination communication apparatus 101 to measure the quality of a downstream communication with the connection-destination communication apparatus 101 being as a transmission originator and the communication apparatus 100 being as a transmission destination.

In FIG. 2, the upstream communication-quality measuring unit 200 and the downstream communication-quality measuring unit 201 measures a communication quality that includes two factors which are a line speed and a latency. However, the communication quality is not limited to those two factors. For example, a communication error occurrence rate, the stability of a line speed may be also adopted as the communication quality.

The term line speed means an amount of data transferable over the network per a unit time. As for the relationship between the communication quality and the line speed, the faster the line speed is, the higher it is determined that the communication quality is.

The term latency means a necessary time after data is transmitted and until a response is returned in data transfer between the communication apparatus 100 and the connection-destination communication apparatus 101. As for the relationship between the communication quality and the latency, the smaller the latency is, the higher it is determined that the communication quality is.

By determining the communication quality based on both line speed and latency, there is an advantage that it becomes possible to distinguish a case in which the line speed is fast but the latency is large and thus the overall communication quality is low, and, a case in which the latency is small but the line speed is slow and thus the overall communication quality is low.

In FIG. 2, the measurement-load controlling unit 109 includes a measurement-load-determination-rule memory 204 that stores a measurement-load determination rule which is defined for each kind of the measured value stored in the measurement-environment memory 107, a controlling timer for communication-quality measuring 205 that changes the cycle of data transfer based on the determination rule, thereby changing the communication load, a data-size determining unit 206 that changes the data size of the data transfer based on the determination rule, thereby changing the communication load, and, a measurement cycle memory 210 that stores a value of the measurement cycle.

The data-size determining unit 206 includes a line-speed determining unit 207 that determines the value of a line speed contained in the communication quality in order to set the data size for upstream and downstream communication quality measurements, a latency determining unit 208 that determines the value of a latency contained in the communication quality in order to set the data size, and a data-size memory 209 that stores the set data size.

In FIG. 2, the controlling apparatus for communication-quality measuring 102 includes, in order to exchange data with other objects in the communication apparatus 100, a measurement-environment transmitting unit 211 that transmits the value in the measurement-environment memory 107 to the service communication unit 104, a service-communication measured-value receiving unit 212 which receives the measured value from the service-communication measuring unit 105 and which stores the received value in the measurement-environment memory 107, and a measured-resource-value receiving unit 213 which receives the measured value from the resource measuring unit 103, and which stores the received value in the measurement-environment memory 107.

Figure 3:
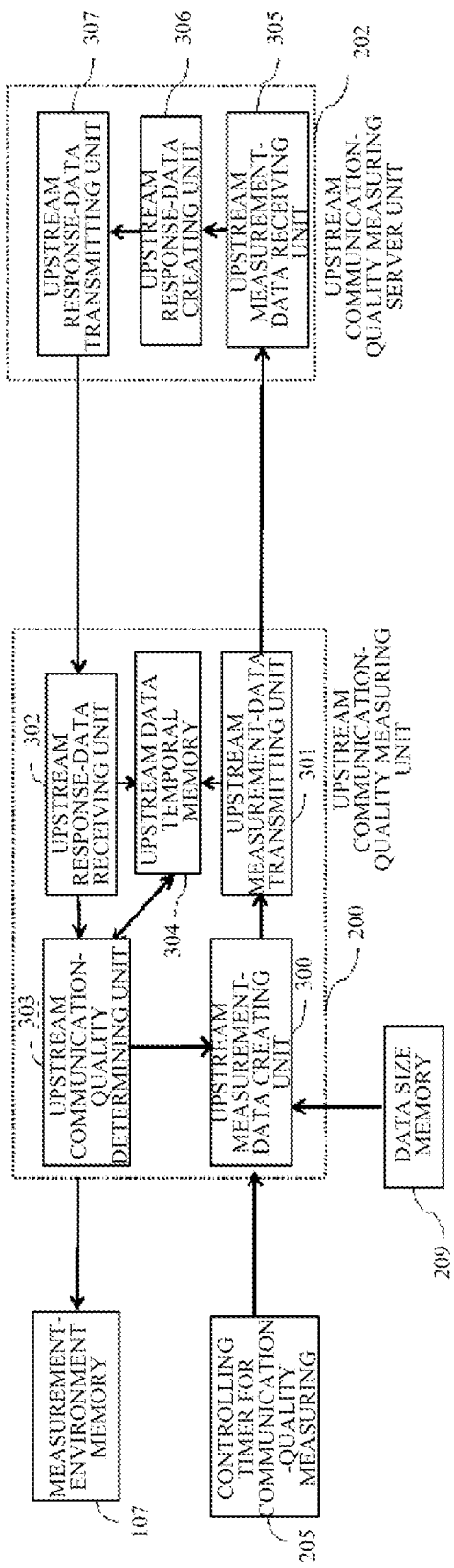
FIG. 3 is a detailed block diagram of an upstream communication-quality measuring unit of the controlling apparatus for communication-quality measuring in the communication apparatus according to an embodiment of the present disclosure.

FIG. 3 is a detailed block diagram of the upstream communication-quality measuring unit 200. The upstream communication-quality measuring unit 200 includes an upstream measurement-data creating unit 300 that creates data for upstream measurement, an upstream measurement-data transmitting unit 301 that transmits this measurement data to the upstream communication-quality measuring server unit 202, an upstream response-data receiving unit 302 that receives a response from the upstream communication-quality measuring server unit 202, an upstream communication-quality determining unit 303 that obtains upstream communication-quality data from the content of the response, and an upstream data temporal memory 304 that temporarily stores data during the measuring process.

Figure 4:
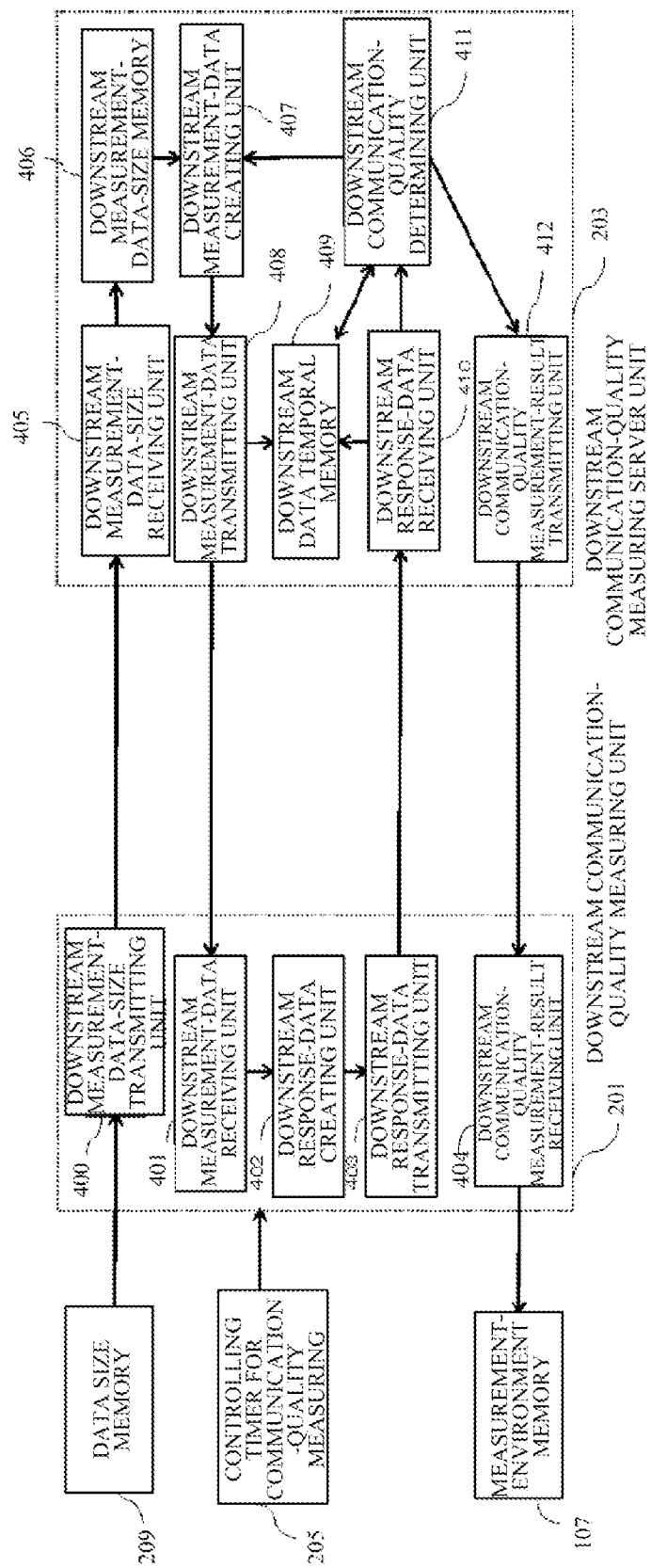
FIG. 4 is a detailed block diagram of a downstream communication-quality measuring unit of the controlling apparatus for communication-quality measuring in the communication apparatus according to an embodiment of the present disclosure.

FIG. 4 is a detailed block diagram of the downstream communication-quality measuring unit 201. The downstream communication-quality measuring unit 201 includes a downstream measurement-data-size transmitting unit 400 that notifies the downstream communication-quality measuring server unit 203 of the data size for downstream measurement, a downstream measurement-data receiving unit 401 that receives data transmitted from the downstream communication-quality measuring server unit 203, a downstream response-data creating unit 402 that creates response data, a downstream response-data transmitting unit 403 that transfers the response data to the connection-destination connection apparatus 101, and a downstream communication-quality measurement-result receiving unit 404 that receives a measurement result from the connection-destination communication apparatus 101.

Figure 5:
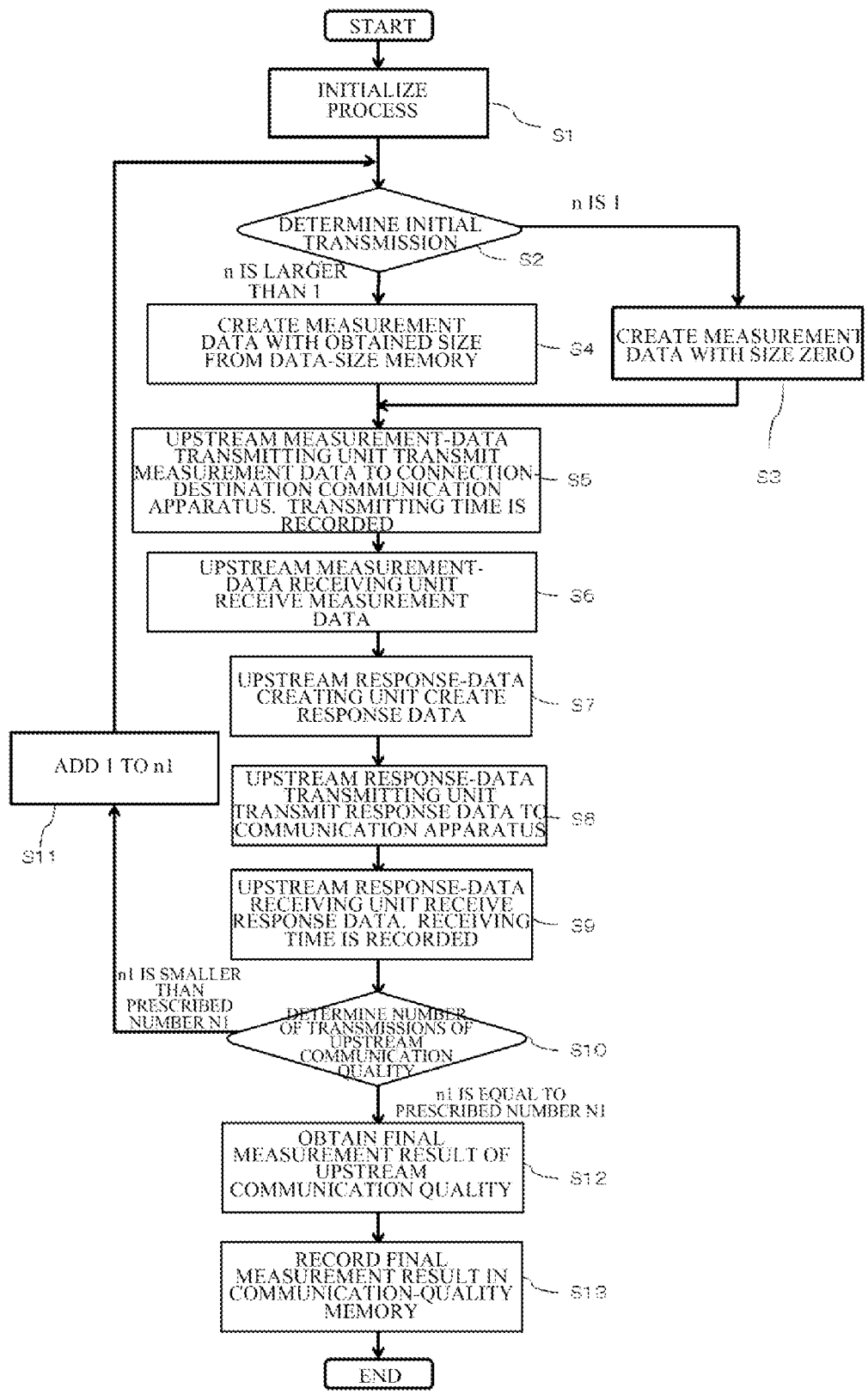
FIG. 5 is an example flowchart of an operation by the upstream communication-quality measuring unit that measures the communication quality of an upstream line in the communication apparatus according to an embodiment of the present disclosure.

FIG. 5 is a diagram that is an example flowchart of an operation by the upstream communication-quality measuring unit 200 which measures the communication quality of the upstream line. An explanation will be given below of the operation of the upstream communication-quality measuring unit 200 with reference to FIG. 5.

When the upstream communication-quality measuring unit 200 starts the measurement, first, the process progresses to step S1.

The measurement is initialized in the step S1, and a setting is made so as to repeat data transmission for measurement by N1 times that is a predetermined number equal to or greater than two, and, the value of a counter n1 to count the number of transmissions is set to be 1. The value of N1 is a substantially single digit, and for example, is 5. The value of the counter n1 is stored in the upstream data temporal memory 304.

It is determined in step S2 whether or not the current opportunity is the initial transmission based on the value of n1, and when n1 is 1, this is an initial transmission. Hence, the process progresses to step S3. Conversely, when n1 is larger than 1, the process progresses to step S4.

The upstream measurement-data creating unit 300 creates in the step S3, to measure the latency without a communication load originating from the data size in the case of the initial transmission, measurement data which has only a necessary header H1 for communication, and which also has a payload data size that is zero.

The upstream measurement-data creating unit 300 creates in the step S4, measurement data which has, in addition to a necessary header H2 for communication, payload data P1 that has the same size as upstream measurement data size B1 stored in the data-size memory 209 in the case of transmission other than the initial transmission. In this case, it is assumed that the size of the header H2 is consistent with the size of the header H1 in the step S3. In addition, the content of the payload data is meaningless random data. When, for example, the upstream measurement data size B1 is 100 kilo-byte, the above payload data is binary data with a random content of 100 kilo-byte.

The data-size memory 209 records, using a table illustrated in FIG. 6, the current upstream measurement data size B1 and downstream measurement data size B2. The data size is a value between, for example, 1 kilo-byte to several hundred kilo-byte.

The upstream measurement-data transmitting unit 301 transmits in step S5, to the upstream communication-quality measuring server unit 202, the upstream measurement data.

At this time, a measurement-data transmitting time T1 is recorded in the upstream data temporal memory 304.

The upstream communication-quality measuring server unit 202 includes, in order to receive the measurement data from the upstream communication-quality measuring unit 200 and to respond thereto, an upstream measurement-data receiving unit 305, an upstream response-data creating unit 306, and an upstream response-data transmitting unit 307.

The upstream measurement-data receiving unit 305 receives in step S6 the measurement data.

The upstream response-data creating unit 306 creates in step S7 response data R1 containing data of several bytes which indicates that the measurement data has surely received.

The upstream response-data transmitting unit 307 transmits, to the upstream communication-quality measuring unit 200, the response data R1 in step S8.

The upstream response-data receiving unit 302 receives in step S9 the response data R1. In addition, a response-data receiving time T2 is stored in the upstream data temporal memory 304.

The upstream data temporal memory 304 stores, using a table illustrated in FIG. 7, the counter n1 for the number of transmissions, the measurement-data transmitting time T1, and the response-data receiving time T2 with a value corresponding to a transmission number being as a row. In this case, for example, the unit of time is expressed in epoch-millisecond.

When the value of the transmission counter n1 is smaller than the predetermined number of times N1 in step S10, the process progresses to step S11. When the value of n1 is equal to N1, the process progresses to step S12.

In the step S11, the value of n1 is incremented by 1, and the process returns to the step S2.

The final measurement result of the upstream line speed is obtained in the step S12 based on a value of the table in the upstream data temporal memory. In general, the latency that is a time until a response to a transmission from the communication apparatus is returned from the connection-destination communication apparatus is obtained by subtracting the measurement-data transmitting time T1 from the response-data receiving time T2. In addition, according to the present disclosure, data transmission for measuring the communication quality and data transmission for the main service other than the measurement of the communication quality are performed simultaneously via the same network. In this case, in consideration of the simultaneous data transmission for the main service, a latency L1 when the counter n1 for the number of transmissions is 1 is equal to a total of a time needed to transfer the communication header H1 and data D1 for the main service via the upstream line, and a time needed to transfer the response data R1 and data D2 for the main service via the downstream line. In addition, a latency L2 when the counter n1 for the number of transmissions is greater than 1 is equal to a total of a time needed to transfer the communication header H2, the payload data P1, and data D3 for the main service via the upstream line, and a time needed to transfer the response data R1 and data D4 for the main service via the downstream line. If the amount of data transfer for the main service remains the same from the start of the measurement to the end thereof, since D1 is equal to D3, D2 is equal to D4, and the size of the communication header H1 is set to be equal to that of H2, a time L3 needed to transfer the payload data P1 via the upstream line is obtained as an approximate value obtained by subtracting the value of L1 from that of L2. A line speed SP1 per a transmission is obtained by dividing a data size B1 of the payload data P1 by the time L3. As for the final measurement result of the upstream line speed, an average value of the line speeds obtained when n1 is larger than 1 is applied. In addition, as for the final measurement result of the communication latency, the value of L1 is applied.

As for the above final measurement result of the upstream line speed, when, for example, the value of N1 is small that is equal to or smaller than 5, in order to eliminate an adverse effect of an outlier, a median value of the line speeds obtained when n1 is larger than 1 may be applied.

The final measurement result of the line speed and that of the latency are recorded in the measurement-environment memory 107 in step S13 as the final measurement result of the upstream communication quality, and the process is terminated.

Figure 8:
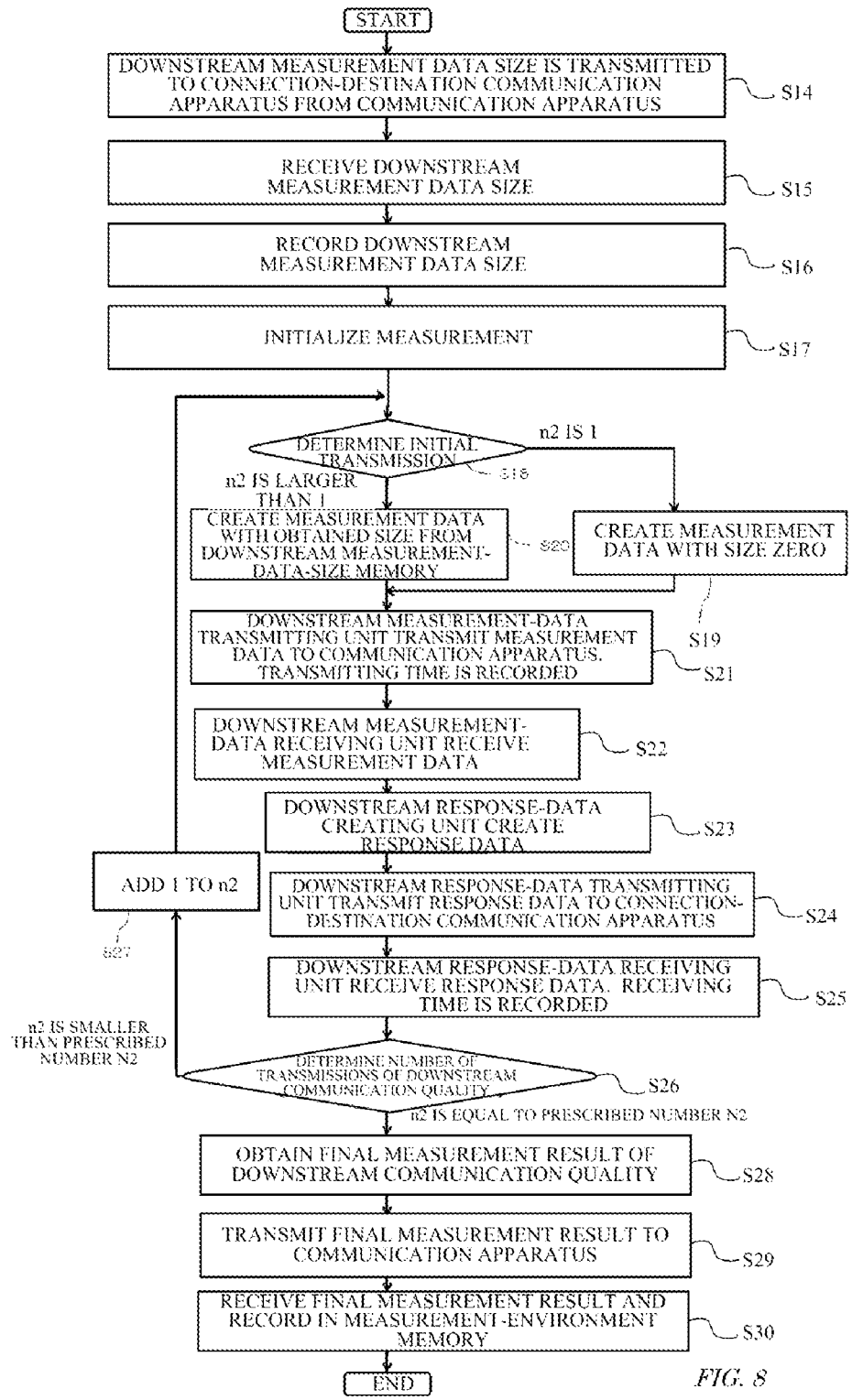
FIG. 8 is an example flowchart of an operation of the downstream communication-quality measuring unit that measures the communication quality of a downstream line in the communication apparatus according to an embodiment of the present disclosure.

FIG. 8 is an example flowchart of an operation by the downstream communication-quality measuring unit 201 which measures the communication quality of the downstream line. An explanation will be given below of the operation of the downstream communication-quality measuring unit 201 with reference to FIG. 8.

When the downstream communication-quality measuring unit 201 starts the measurement, first, the process progresses to step S14.

The downstream measurement-data-size transmitting unit 400 takes out the downstream measurement data size B2 from the data-size memory 209, and transmits the taken-out data size to the downstream communication-quality measuring server unit 203 in the step S14. The data size is, for example, a value between 1 kilo-byte to several hundred kilo-byte.

The downstream communication-quality measuring server unit 203 includes, in order to transmit the measurement data to the downstream communication-quality measuring unit 201 and to receive a response, thereby measuring the downstream communication quality, a downstream measurement-data-size receiving unit 405, a downstream measurement-data-size memory 406, a downstream measurement-data creating unit 407, a downstream measurement-data transmitting unit 408, a downstream data temporal memory 409, a downstream response-data receiving unit 410, a downstream communication-quality determining unit 411, and a downstream communication-quality measurement-result transmitting unit 412.

The downstream measurement-data-size receiving unit 405 receives the data size B2 in step S15.

The data size B2 is recorded in the downstream measurement-data-size memory 406 in step S16.

In step S17, the measurement is initialized, and a setting is made so as to repeat data transmission for measurement by N2 times that is a predetermined number equal to or greater than 2, and the value of a counter n2 to count the number of transmissions is set to be 1. The value of N2 is a substantially single digit, and for example, is 5. The value of the counter n2 is stored in the downstream data temporal memory 409.

It is determined in step S18 whether or not the current opportunity is the initial transmission based on the value of n2, and when n2 is 1, this is an initial transmission. Hence, the process progresses to step S19. Conversely, when n2 is larger than 1, the process progresses to step S20.

The downstream measurement-data creating unit 407 creates in the step S19, to measure the latency without a communication load originating from the data size in the case of the initial transmission, measurement data which has only a necessary header H3 for communication, and which also has a payload data size that is zero.

The downstream measurement-data creating unit 407 creates in the step S20, measurement data which has, in addition to a necessary header H4 for communication, payload data P2 that has the same size as the downstream measurement data size B2 stored in the downstream data-size memory 406 in the case of transmission other than the initial transmission. In this case, it is assumed that the size of the header H4 is consistent with the size of the header H3 in the step S19. In addition, the content of the payload data is meaningless random data. When, for example, the downstream measurement data size B2 is 200 kilo-byte, the above payload data is binary data with a random content of 200 kilo-byte.

The downstream measurement-data transmitting unit 408 transmits in step S21, to the communication apparatus 100, the downstream measurement data. At this time, a measurement-data transmitting time T3 is recorded in the downstream data temporal memory 409.

The downstream measurement-data receiving unit 401 receives in step S22 the measurement data.

The downstream response-data creating unit 402 creates in step S23 response data R2 containing data of several bytes which indicates that the measurement data has surely received.

The downstream response-data transmitting unit 403 transmits in step S24, to the connection-destination communication apparatus 100, the response data R2.

The downstream response-data receiving unit 410 receives in step S25 the response data R2. In addition, a response-data receiving time T4 is stored in the downstream data temporal memory 409.

The downstream data temporal memory 409 stores, using a table illustrated in FIG. 9, the counter n2 for the number of transmissions, the measurement-data transmitting time T3, and the response-data receiving time T4 with a value corresponding to a transmission number being as a row. In this case, for example, the unit of time is expressed in epoch-millisecond.

When the value of the transmission counter n2 is smaller than N2 in step S26, the process progresses to step S27. When the value of n2 is equal to N2, the process progresses to step S28.

In the step S27, the value of n2 is incremented by 1, and the process returns to the step S18.

The final measurement result of the downstream line speed is obtained in the step S28 based on a value of the table in the downstream data temporal memory 409. The downstream latency is obtained by subtracting the measurement-data transmitting time T3 from the response-data receiving time T4. In this case, in consideration of the simultaneous data transmission for the main service, a latency L4 when the counter n2 for the number of transmissions is 1 is equal to a total of a time needed to transfer the communication header H3 and data D5 for the main service via the downstream line, and a time needed to transfer the response data R2 and data D6 for the main service via the upstream line. In addition, a latency L5 when the counter n2 for the number of transmissions is greater than 1 is equal to a total of a time needed to transfer the communication header H4, data D7 for the main service, and the payload data P2 via the downstream line, and a time needed to transfer the response data R2 and data D8 for the main service via the upstream line. If the amount of data for the main service remains the same from the start of the measurement to the end thereof, since D5 is equal to D7, D6 is equal to D8, and the size of the communication header H3 is set to be equal to that of H4, a time L6 needed to transfer the payload data P2 via the downstream line is obtained as an approximate value obtained by subtracting the value of L4 from that of L5. A line speed SP2 per a transmission is obtained by dividing a data size B2 of the payload data P2 by the time L6. As for the final measurement result of the downstream line speed, an average value of the line speeds obtained when n2 is larger than 1 is applied. In addition, as for the final measurement result of the communication latency, the value of L4 is applied.

As for the above final measurement result of the downstream line speed, when, for example, the value of N2 is small that is equal to or smaller than 5, in order to eliminate an adverse effect of an outlier, a median value of the line speeds obtained when n2 is larger than 1 may be applied.

The downstream communication-quality measurement-result transmitting unit 412 transmits, in step S29, the final measured value of the downstream communication quality that includes the final measurement result of the downstream line speed and that of the latency to the communication apparatus 100.

The downstream communication-quality measurement-result receiving unit 404 records the received measured value in the measurement-environment memory 107 in step S30, and the process is terminated.

The measurement-environment memory 107 records, using an individual table for each entry, the measured value by the upstream communication-quality measuring unit 200, the measured value by the downstream communication-quality measuring unit 201, the measured value by the resource measuring unit 103, and the measured value by the service-communication measuring unit 105, as a set of the measurement time and the measured value in a table illustrated in FIG. 10. In FIG. 10, for example, a value that is 510 kbps is recorded as the measured value of the upstream line speed at a time 137172024418, and the value that is 40 milliseconds is recorded as the measured value of the upstream latency at a time 137172024418. In addition to those measured values, for example, the measured value of the downstream line speed, the measured value of the downstream latency, the measured value of the radio wave intensity by the resource measuring unit 103, the measured value of the travelling status by the resource measuring unit 103, the measured value of input sound by the service-communication measuring unit 105, and the measured value of sound output by the service-communication measuring unit 105 are also recorded.

Figure 11:
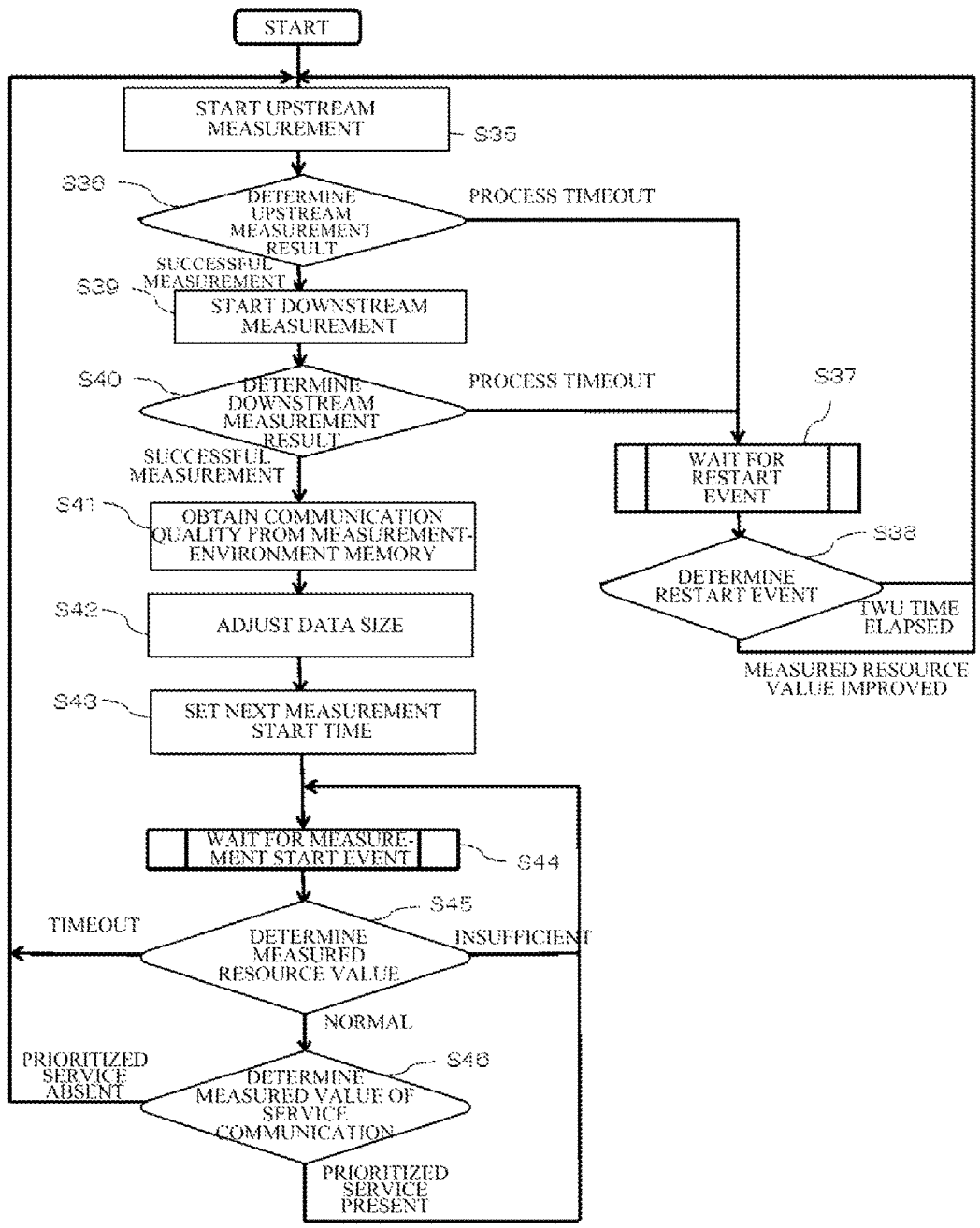
FIG. 11 is a diagram illustrating an example flowchart of an operation by the controlling apparatus for communication-quality measuring that controls a communication load at the time of measurement in the communication apparatus according to an embodiment of the present disclosure.

FIG. 11 is an example flowchart of an operation by the controlling apparatus for communication-quality measuring 102 which controls the communication load at the time of measurement. An explanation will be given below of an example case in which the measurement-environment monitor 108 monitors a change in measured value stored in the measurement-environment memory 107, and the measurement-load controlling unit 109 changes the communication load adopted by the communication-quality measuring unit 106 based on the value of the measured environment with reference to FIG. 11.

Together with the start of the operation of the controlling apparatus for communication-quality measuring 102, the measurement-environment monitor 108 starts always monitoring a change in measured value stored in the measurement-environment memory 107, and when there is a change, the measurement-environment monitor 107 notifies the measurement-load controlling unit 109 and the measurement-environment transmitting unit 211 of the changed entry.

The upstream communication-quality measuring unit 200 is notified of the start of measurement in step S35, and the process once stands by, but while this standby operation, the process progresses to step S36 to wait for a notification from the measurement-environment monitor 108.

When the upstream communication-quality measuring unit 200 records a new communication quality in the measurement-environment memory 107 in the step S36, the process progresses to step S39.

When there is no notification although a prescribed time has elapsed in the step S36, it is a process timeout that has occurred due to a communication failure, and thus the process progresses to step S37.

In the step S37, the process once stands by, but progresses to step S38 while this standby operation to wait for a process restart event.

When, in the step S38, a time TWU has elapsed since the start of process standby in the step S37, it is estimated that a cause of the process timeout like a communication failure is possibly eliminated, and the process returns to the step S35.

Before the time IWU elapses after the process standby starts in the step S37, when the measurement-environment monitor 108 notifies in the step S38 of a change in measured resource value, and when, in comparison with the measured value at the time of the start of process standby, the most recent measured value is improved, the process immediately returns to the step S35. A determination criterion for the improvement of the measured resource value is stored in the measurement-load-determination-rule memory 204 as the measurement-load determination rule. When, for example, the measured resource value is a radio wave intensity, if the most recent measured value becomes large, it is determined that there is an improvement. Alternatively, when the measured resource value is a travel amount, if the most recent measured value becomes small, it is determined that there is an improvement.

The downstream communication-quality measuring unit 201 is notified of the start of measurement in the step S39, the process once stands by but progresses to step S40 during the standby operation to wait for a notification of the measurement result.

When the downstream communication-quality measuring unit 201 records a new communication quality in the measurement-environment memory 107 in the step S40, the process progresses to step S41.

When there is no notification although a prescribed time has elapsed in the step S40, it is a process timeout that has occurred due to a communication failure, and thus the process progresses to step S37.

The data-size determining unit 206 obtains, from the measurement-environment memory 107 in the step S41, a most recent upstream line speed SPUN1, a most recent upstream latency LTUN1, a most recent downstream line speed SPDN1, and a most recent downstream latency LTDN1, all as the communication quality, and progresses the process to step S42.

The data size for communication-quality measurement is adjusted in the step S42 based on values of the upstream and downstream line speeds and latencies, and the process progresses to step S43. The detail of the process in the step S42 will be explained later with reference to FIG. 12.

The controlling timer for communication-quality measuring 205 sets the current time as a standby start time in the step S43. In addition, a prescribed value TSU1 of the measurement cycle is obtained from the measurement cycle memory 210, and a time obtained by adding TSU1 to the current time is set as the next measurement start time. Subsequently, the process progresses to step S44.

The communication-quality measuring and controlling timer 205 stands by in the step S44, and when the current time reaches the next measurement start time, the process progresses to step S45.

The controlling timer for communication-quality measuring 205 determines in the step S45 whether the communication resource available for communication-quality measurement data transfer is in a normal status or in an insufficient status. When it is determined as being in the normal status, the process progresses to step S46. When it is determined as being in the insufficient status, in order to wait for the recovery of the status from the insufficient status to the normal status, a prescribed value TSU2 is added to the current time, and a resultant value is set as the new next measurement start time in the controlling timer for communication-quality measuring 205, and the process returns to the step S44. When, however, the current time has gone by a time obtained by adding a prescribed time TSU3 to the standby start time, it is determined that a timeout has occurred, and the process returns to the step S35. Hence, the next measurement starts.

The measured resource value recorded in the measurement-environment memory 107, and the rule stored in the measurement-load-determination-rule memory 204 are applied for the determination. When, for example, the measured resource value is the radio wave intensity, and when the most recent measured value is smaller than a prescribed value, it is determined that the resource is insufficient.

In the above determination, when, for example, the measured resource value is a travel amount, and when the most recent measured value is larger than a prescribed value, it is estimated that the communication apparatus is travelling at a speed equal to or faster than a walking speed, and is determined that the resource is insufficient based on an assumption that due to a change in positional relationship with abase station and an obstacle, the communication quality is likely to decrease temporarily.

The controlling timer for communication-quality measuring 205 determines in step S46 the presence/absence of a service that is performing prioritized data transfer among service communications. When it is determined that there is no such a service, the process returns to the step S35, and the next measurement starts. When it is determined that there is such a service, in order to wait for a status in which there is no such a service, a value obtained by adding a prescribed value TSU4 to the current time is set as the new next measurement start time in the controlling timer for communication-quality measuring 205, and the process returns to the step S44.

The measured service value recorded in the measurement-environment memory 107, and the rule stored in the measurement-load-determination-rule memory 204 are applied for the determination. When, for example, the measured service value is an amount of sound input/output data, and when the most recent measured value is larger than a prescribed value, it is determined that there is a service that is performing prioritized data transfer. This enables the communication apparatus to postpone the start of the next measurement, and to prioritize the sound input/output data transfer. This is advantageous in the case of services that place importance on the quality assurance of sound data rather than quality assurance of other kinds of data like a Web conferencing.

Figure 12:
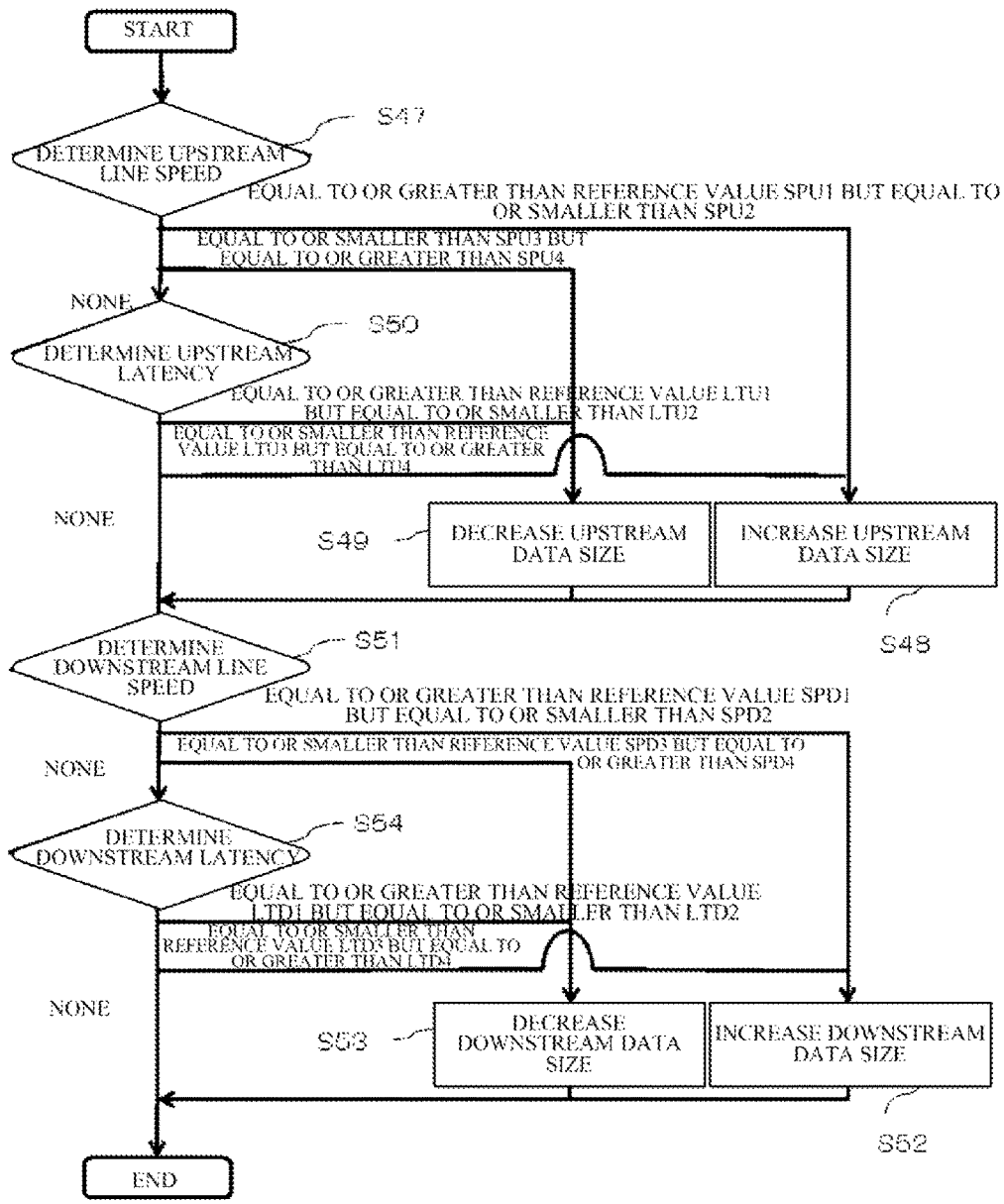
FIG. 12 is a diagram illustrating an example flowchart of an operation by the controlling apparatus for communication-quality measuring that adjusts a data size at the time of measurement according to a line speed and a latency in the communication apparatus according to an embodiment of the present disclosure.

FIG. 12 is an example detailed flowchart of an operation in the process of adjusting the data size in the step S42 in FIG. 11. An explanation will be given of an operation of adjusting the data size for communication-quality measurement based on the values of upstream and downstream line speeds and latencies with reference to FIG. 12.

The data size for upstream communication-quality measurement is increased or decreased in step S47 based on the value of the upstream line speed. When the upstream line speed is slow, the data size is decreased in order to reduce the communication load. When the communication quality is measured based on the data size of data transfer and a time needed to the transfer, data transfer with a small communication load does not enable a measurement of the communication quality up to the maximum. Hence, when the upstream line speed is fast, the data size is increased in order to more precisely measure the maximum communication quality.

The process performed in the step S47 will be explained in more detail. The line-speed determining unit 207 compares the value of the upstream line speed SPUN1 with a reference value. When SPUN1 is equal to or greater than a reference value SPU1 but is equal to or smaller than a reference value SPU2, the process progresses to step S48 to increase the data size for measurement. When SPUN1 is equal to or smaller than a reference value SPU3 but is equal to or greater than a reference value SPU4, the process progresses to step S49 to decrease the data size for measurement. When none of the conditions is satisfied, the process directly progresses to step S50. In this case, SPU1 is a smaller value than SPU2, SPU3 is a smaller value than SPU1, and SPU4 is a smaller value than SPU3.

The data-size determining unit 206 obtains, from the data-size memory 209 in the step S48, a current upstream measurement data size DSUC1, and sets a new upstream measurement data size DSUU1 obtained by adding a prescribed value DSUD1 to DSUC1. When, however, DSUU1 exceeds a prescribed value DSUMAX, DSUMAX is set as the value of DSUU1. The value of DSUU1 is recorded in the data-size memory 209 as the current upstream measurement data size. Subsequently, the process progresses to step S51.

The data-size determining unit 206 obtains, from the data-size memory 209 in the step S49, the current upstream measurement data size DSUC1, and sets a new upstream measurement data size DSUU2 obtained by subtracting a prescribed value DSUD2 from DSUC1. When, however, DSUU2 is smaller than a prescribed value DSUMIN, DSUMIN is set as the value of DSUU2. The value of DSUU2 is recorded in the data-size memory 209 as the current upstream measurement data size. Subsequently, the process progresses to step S51. Note that the prescribed values DSUD1 and DSUD2 may be the same value or the different values.

The data size for upstream communication-quality measurement is increased or decreased in step S50 based on the value of the upstream latency. When the upstream latency is large, the data size is decreased in order to reduce the communication load. When the upstream latency is small, the data size is increased in order to more precisely measure the maximum communication quality.

The process performed in the step S50 will be explained in more detail. The latency determining unit 208 compares the value of the upstream latency LTUN1 with a reference value. When LTUN1 is equal to or greater than a reference value LTU1 but is equal to or smaller than a reference value LTU2, the process progresses to the step S49 to decrease the data size for measurement. When LTUN1 is equal to or smaller than a reference value LTU3 but is equal to or greater than a reference value LTU4, the process progresses to the step S48 to increase the data size for measurement. When none of the conditions is satisfied, the process directly progresses to step S51. In this case, LTU1 is a smaller value than LTU2, LTU3 is a smaller value than LTU1, and LTU4 is a smaller value than LTU3.

The data size for downstream communication-quality measurement is increased or decreased in the step S51 based on the value of the downstream line speed. When the downstream line speed is slow, the data size is decreased in order to reduce the communication load. When the downstream line speed is fast, the data size is increased in order to more precisely measure the maximum communication quality.

The process performed in the step S51 will be explained in more detail. The line-speed determining unit 207 compares the value of the downstream line speed SPDN1 with a reference value. When SPDN1 is equal to or greater than a reference value SPD1 but is equal to or smaller than a reference value SPD2, the process progresses to step S52 to increase the data size for measurement. When SPDN1 is equal to or smaller than a reference value SPD3 but is equal to or greater than a reference value SPD4, the process progresses to step S53 to decrease the data size for measurement. When none of the conditions is satisfied, the process directly progresses to step S54. In this case, SPD1 is a smaller value than SPD2, SPD3 is a smaller value than SPD1, and SPD4 is a smaller value than SPD3.

The data-size determining unit 206 obtains, from the data-size memory 209 in the step S52, a current downstream measurement data size DSDC1, and sets a new downstream measurement data size DSDU1 obtained by adding a prescribed value DSDD1 to DSDC1. When, however, DSDU1 exceeds a prescribed value DSDMAX, DSDMAX is set as the value of DSDU1. The value of DSDU1 is recorded in the data-size memory 209 as the current downstream measurement data size. Subsequently, the process is terminated.

The data-size determining unit 206 obtains, from the data-size memory 209 in the step S53, the current downstream measurement data size DSDC1, and sets a new downstream measurement data size DSDU2 obtained by subtracting a prescribed value DSDD2 from DSDC1. When, however, DSDU2 is smaller than a prescribed value DSDMIN, DSDMIN is set as the value of DSDU2. The value of DSDU2 is recorded in the data-size memory 209 as the current downstream measurement data size. Subsequently, the process is terminated. Note that the prescribed values DSDD1 and DSDD2 may be the same value or the different values.

The data size for downstream communication-quality measurement is increased or decreased in step S54 based on the value of the downstream latency. When the downstream latency is large, the data size is decreased in order to reduce the communication load. When the downstream latency is small, the data size is increased in order to more precisely measure the maximum communication quality.

The process performed in the step S54 will be explained in more detail. The latency determining unit 208 compares the value of the downstream latency LTDN1 with a reference value. When LTDN1 is equal to or greater than a reference value LTD1 but is equal to or smaller than a reference value LTD2, the process progresses to the step S53 to decrease the data size for measurement. When LTDN1 is equal to or smaller than a reference value LTD3 but is equal to or greater than a reference value LTD4, the process progresses to the step S52 to increase the data size for measurement. When none of the conditions is satisfied, the process is directly terminated. In this case, LTD1 is a smaller value than LTD2, LTD3 is a smaller value than LTD1, and LTD4 is a smaller value than LTD3.

Figure 13:
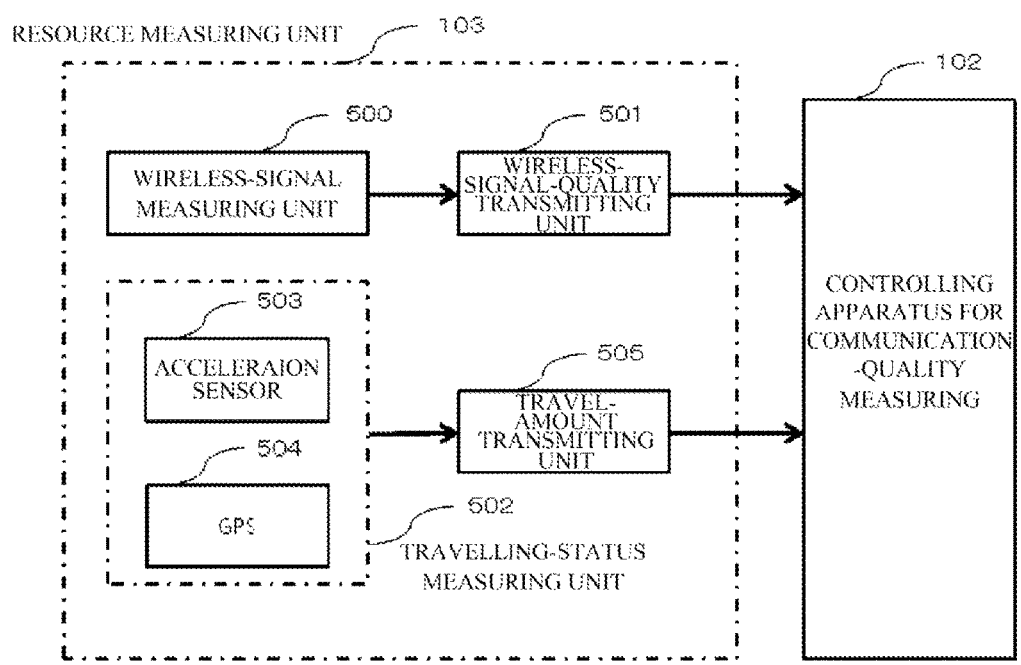
FIG. 13 is a detailed block diagram of a resource measuring unit in the communication apparatus according to an embodiment of the present disclosure.

FIG. 13 is a detailed block diagram of the resource measuring unit 103 according to this embodiment. In order to measure a resource with respect to a wireless signal, the resource measuring unit 103 includes a wireless-signal measuring unit 500, and a wireless-signal-quality transmitting unit 501. In order to measure a resource with respect to the travelling status of the position of the communication apparatus 100, the resource measuring unit 103 includes a travelling-status measuring unit 502, and a travelling-amount transmitting unit 505.

As illustrated in FIG. 13, the travelling-status measuring unit 502 includes an acceleration sensor 503 that detects the acceleration applied to the communication apparatus 100, and a GPS 504 which detects a signal from a GPS satellite, and which calculates positional information.

Figure 14:
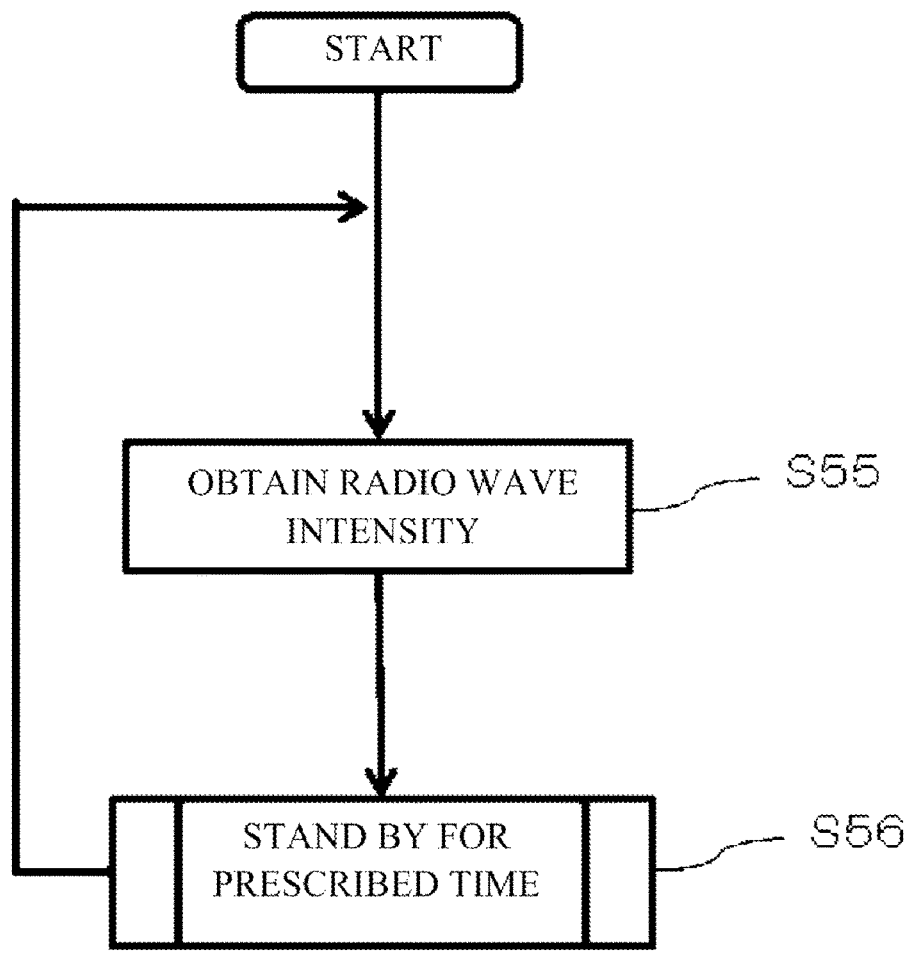
FIG. 14 is an example flowchart of an operation by the resource measuring unit that measures a wireless signal in the communication apparatus according to an embodiment of the present disclosure.

FIG. 14 is an example flowchart of an operation by the resource measuring unit 103 which measures a wireless signal. An explanation will be given of an operation of the wireless-signal measuring unit 500 which measures a wireless signal at a certain cycle, and which transmits the measured value to the controlling apparatus for communication-quality measuring 102 with reference to FIG. 14.

The wireless-signal measuring unit 500 obtains the radio wave intensity of a radio wave in step S55, and the wireless-signal-quality transmitting unit 501 transmits the obtained value to the measured-resource-value receiving unit 213 of the controlling apparatus for communication-quality measuring 102. Hence, the radio wave intensity is stored in the measurement-environment memory 107.

The process stands by in step S56 for a predetermined time, and then returns to the step S55.

Figure 15:
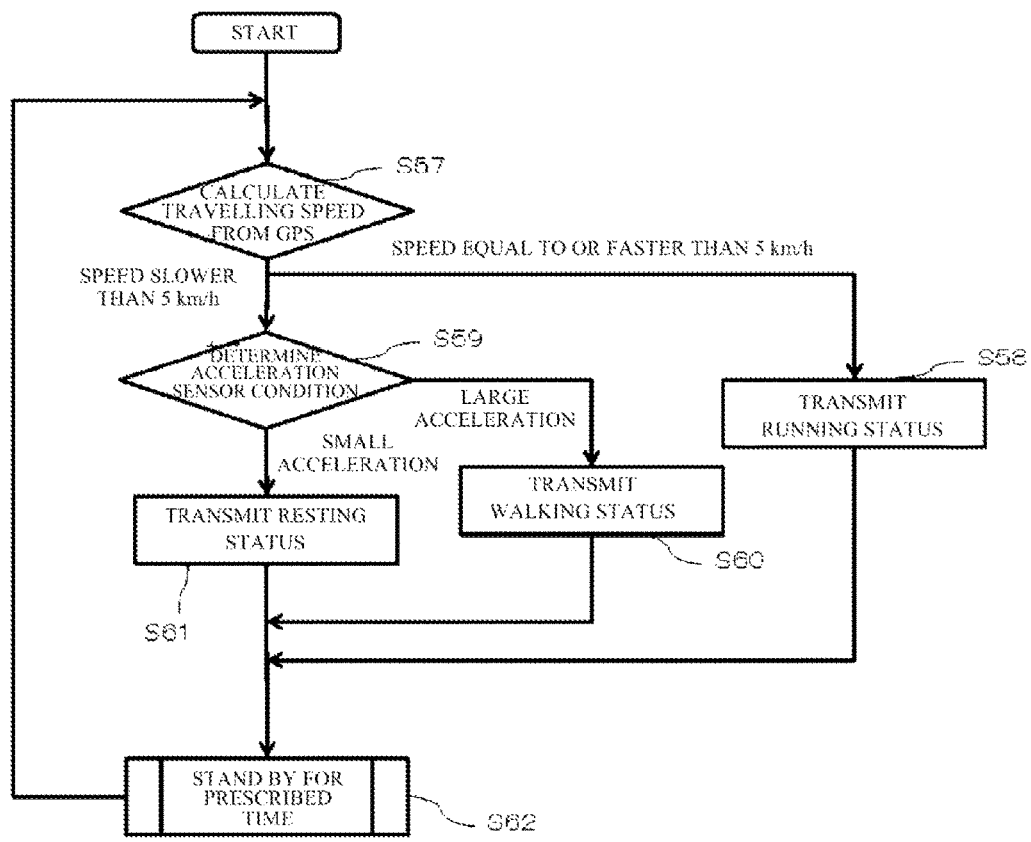
FIG. 15 is an example flowchart of an operation by the resource measuring unit that measures a travelling status in the communication apparatus according to an embodiment of the present disclosure.

FIG. 15 is an example flowchart of an operation by the resource measuring unit 103 which measures the travelling status. An explanation will be given of an operation of the travelling-status measuring unit 502 which measures, at a certain cycle, the travelling status of the position of the communication apparatus 100, and transmits the measured value to the controlling apparatus for communication-quality measuring 102 to store the measured value in the measurement-environment memory 107.

The GPS 504 calculates the travelling speed of the communication apparatus 100 in step S57 based on a change with time in GPS positional information, and when the travelling speed is equal to or faster than 5 km/h, it is determined that the communication apparatus is in a vehicle, etc., and is in a running status, and, the process progresses to step S58. When the travelling speed is slower than 5 km/h, the process progresses to step S59.

The running status of the communication apparatus is expressed as a value, and the travelling-amount transmitting unit 505 transmits this value to the controlling apparatus for communication-quality measuring 102 in the step S58. For example, the running status is expressed by a numerical value that is 3.

It is determined in the step S59 whether or not the communication apparatus 100 is in a resting status based on the acceleration applied to the communication apparatus 100 and obtained by the acceleration sensor 503. When the acceleration is smaller than a prescribed value, it is determined that the communication apparatus is in a resting status, and the process progresses to step S61. When the acceleration is equal to or larger than the prescribed value, the acceleration is applied although the communication apparatus is not in a running status, and thus it is determined that the communication apparatus is in a walking status, and the process progresses to step S60.

The walking status of the communication apparatus is expressed as a value, and the travelling-amount transmitting unit 505 transmits this value to the controlling apparatus for communication-quality measuring 102 in the step S60. For example, the walking status is expressed by a numerical value that is 2.

The resting status of the communication apparatus is expressed as a value, and the travelling-amount transmitting unit 505 transmits this value to the controlling apparatus for communication-quality measuring 102 in the step S61. For example, the walking status is expressed by a numerical value that is 1.

In step S62, the process stands by for a predetermined time, and then returns to the step S57.

Figure 16:
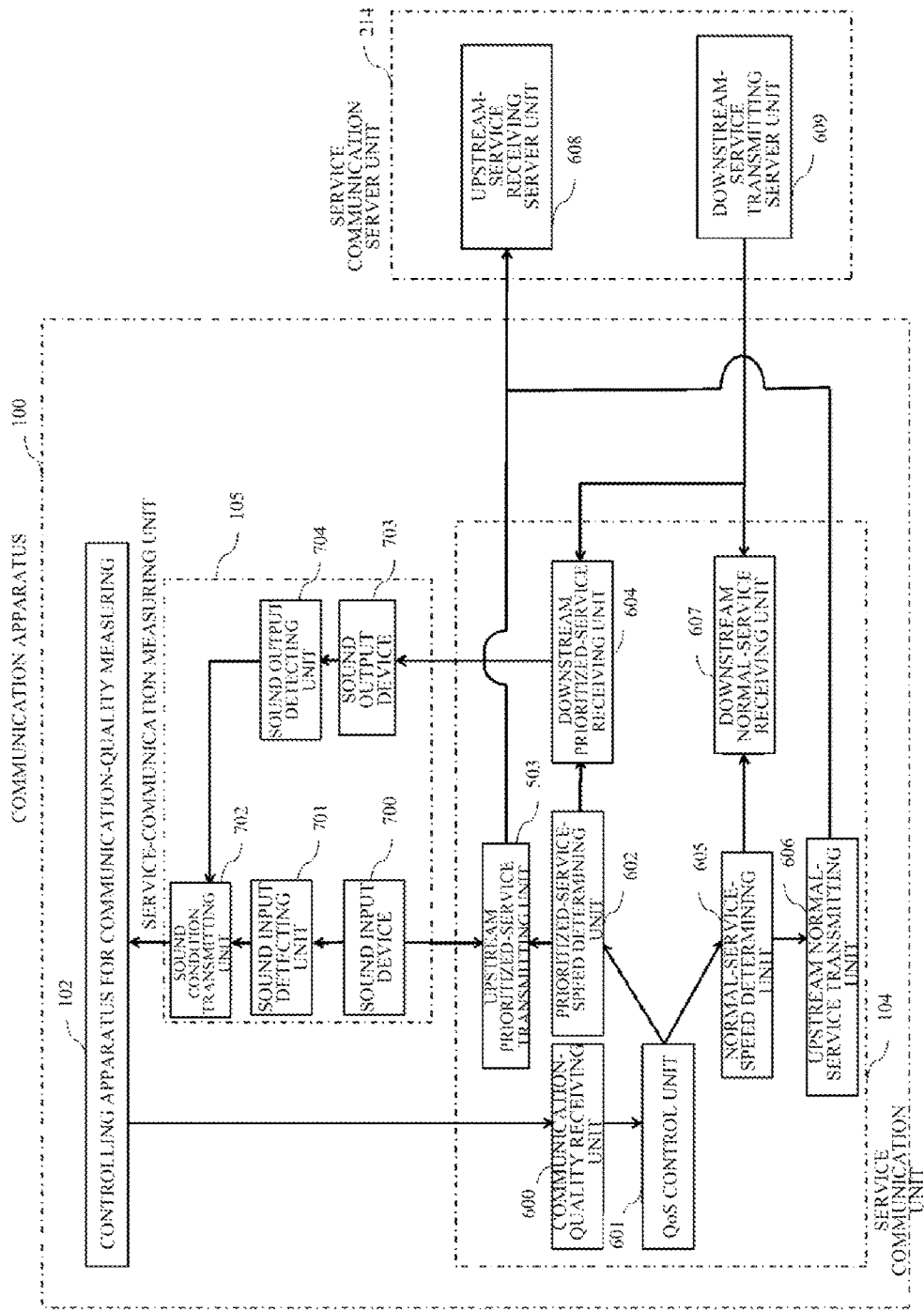
FIG. 16 is a detailed block diagram of a service communication unit and also a service-communication measuring unit in the communication apparatus according to an embodiment of the present disclosure.

FIG. 16 is a detailed block diagram of the service communication unit 104, the service-communication measuring unit 105, and a service communication server unit 214. The service communication unit 104 includes a communication-quality receiving unit 600, a QoS controlling unit 601, a prioritized-service-speed determining unit 602, an upstream prioritized-service transmitting unit 603, a downstream prioritized-service receiving unit 604, a normal-service-speed determining unit 605, an upstream normal-service transmitting unit 606, and a downstream normal-service receiving unit 607. In the case of FIG. 16, the prioritized service is sound data transfer, and the service-communication measuring unit 105 includes a sound input device 700, a sound input detecting unit 701, a sound condition transmitting unit 702, a sound output device 703, and a sound output detecting unit 704. The service communication server unit 214 includes an upstream-service receiving server unit 608, and a downstream-service transmitting server unit 609.

The upstream prioritized-service transmitting unit 603 and the upstream normal-service transmitting unit 606 transmit upstream data to the upstream-service receiving server unit 608 for the main service.

The downstream prioritized-service transmitting unit 604 and the downstream normal-service transmitting unit 607 receive downstream data from the downstream-service transmitting server unit 609 for the main service.

Figure 17:
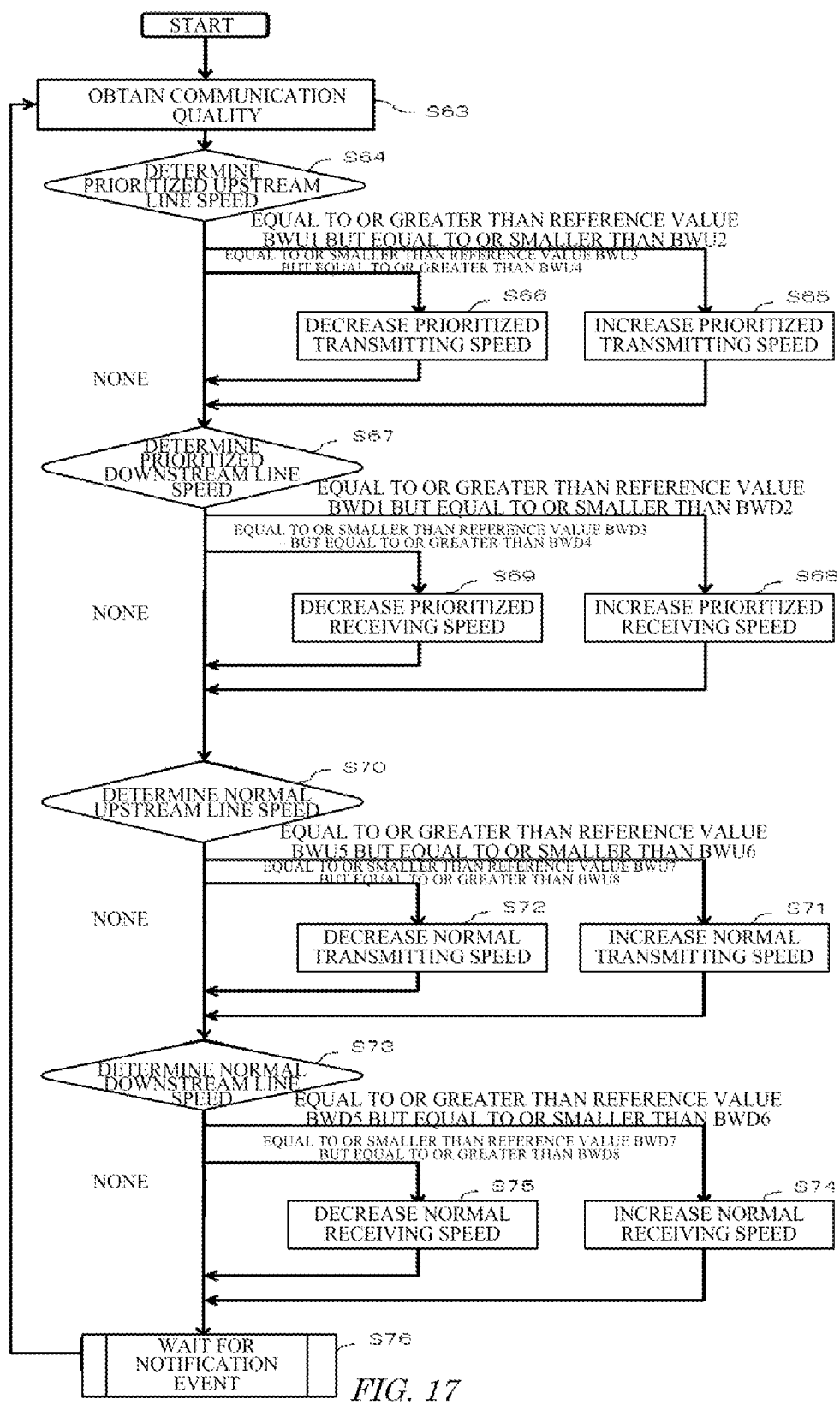
FIG. 17 is an example flowchart of a communication operation that maintains a service quality based on a communication quality in the communication apparatus according to an embodiment of the present disclosure.

FIG. 17 is an example flowchart of an operation of performing communication while maintaining the service quality based on the communication quality. An explanation will be given of an operation of the controlling apparatus for communication-quality measuring 102 which determines an appropriate service communication speed based on the measured communication quality with reference to FIG. 17.

The communication-quality receiving unit 600 obtains, from the measurement-environment memory 107 of the controlling apparatus for communication-quality measuring 102, respective measured values of the upstream line speed and the downstream line speed in step S63.

The prioritized-service-speed determining unit 602 determines the value of line speed, thereby determining the transmitting speed for the prioritized service in step S64. When the upstream line speed is equal to or faster than a reference value BWU1 and is equal to or slower than BWU2, the process progresses to step S65. When the upstream line speed is equal to or slower than a reference value BWU3 and is equal to or faster than BWU4, the process progresses to step S66. In other cases, the process progresses to step S67.

The prioritized-service-speed determining unit 602 increases the upstream transmitting speed of the prioritized service in the step S65.

The prioritized-service-speed determining unit 602 decreases the upstream transmitting speed of the prioritized service in the step S66.

The prioritized-service-speed determining unit 602 determines the value of line speed, thereby determining the receiving speed for the prioritized service in step S67. When the downstream line speed is equal to or faster than a reference value BWD1 and is equal to or slower than BWD2, the process progresses to step S68. When the downstream line speed is equal to or slower than a reference value BWD3 and is equal to or faster than BWD4, the process progresses to step S69. In other cases, the process progresses to step S70.

The prioritized-service-speed determining unit 602 increases the downstream receiving speed of the prioritized service in the step S68.

The prioritized-service-speed determining unit 602 decreases the downstream receiving speed of the prioritized service in the step S69.

The normal-service-speed determining unit 605 determines the value of line speed, thereby determining the transmitting speed for the normal service in the step S70. When the upstream line speed is equal to or faster than a reference value BWU5 and is equal to or slower than BWU6, the process progresses to step S71. When the upstream line speed is equal to or slower than a reference value BWU7 and is equal to or faster than BWU8, the process progresses to step S72. In other cases, the process progresses to step S73.

The normal-service-speed determining unit 605 increases the upstream transmitting speed of the normal service in the step S71.

The normal-service-speed determining unit 605 decreases the upstream transmitting speed of the normal service in the step S72.

The normal-service-speed determining unit 605 determines the value of line speed, thereby determining the receiving speed for the normal service in step S73. When the downstream line speed is equal to or faster than a reference value BWD5 and is equal to or slower than BWD6, the process progresses to step S74. When the downstream line speed is equal to or slower than a reference value BWD7 and is equal to or faster than BWD8, the process progresses to step S75. In other cases, the process progresses to step S76.

The normal-service-speed determining unit 605 increases the downstream receiving speed of the normal service in the step S74.

The normal-service-speed determining unit 605 decreases the downstream receiving speed of the normal service in the step S75.

The process stands by until a notification to the effect that the value of the communication quality has changed is received from the measurement-environment monitor 108 in step S76, and after receiving the notification, the process is restarted and returns to the step S63.

Figure 18:
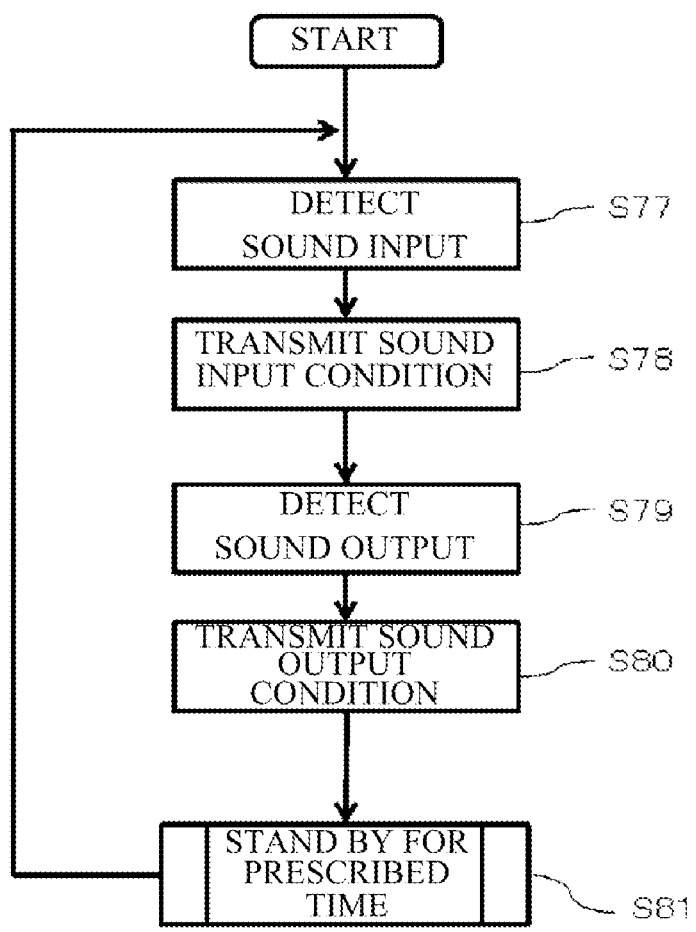
FIG. 18 is an example flowchart of an operation by the service-communication measuring unit that detects sound service data in the communication apparatus according to an embodiment of the present disclosure.

FIG. 18 is an example flowchart of an operation by the service-communication measuring unit 105 which detects data of the prioritized service.

The sound input detecting unit 701 obtains, from the sound input device 700, a sound input level in step S77.

The sound condition transmitting unit 702 transmits, to the controlling apparatus for communication-quality measuring 102, the sound input level in step S78.

The sound output detecting unit 704 obtains, from the sound output device 703, a sound output level in step S79.

The sound condition transmitting unit 702 transmits, to the controlling apparatus for communication-quality measuring 102, the sound output level in step S80.

The process stands by for a predetermined time in step S81, and then returns to the step S77.

Effect of First Embodiment

As explained above, according to the first embodiment, the controlling apparatus for communication-quality measuring includes the communication-quality measuring unit 106 that performs data transfer with a communication load at a predetermined cycle to measure the communication quality value, the measurement-environment memory 107 that stores the communication quality value, the measurement-environment monitor 108 that monitors a change in communication quality value stored in the measurement-environment memory 107, and the measurement-load controlling unit 109 that changes the communication load according to the change in stored value in the measurement-environment memory 107.

Hence, the communication load for communication quality measurement is flexibly changeable according to the communication quality. Accordingly, it becomes possible for the controlling apparatus for communication-quality measuring to suppress a tendency that the communication quality measurement itself to control the service communication quality becomes a factor of reducing the service communication quality, and to always maximally utilize the communication resource for the service. Therefore, according to the first embodiment, a tendency that the service communication quality decreases is suppressible. In particular, the present disclosure is beneficial for ubiquitous communications that have various communication environments changing from moment to moment.

As for the method of changing the communication load, when the communication quality value is lower than a prescribed value, the communication load may be reduced. In addition, as for the method of changing the communication load, the data size of data transfer for communication quality measurement may be changed. Those changing methods are simple methods which do not apply load to the computer process, and thus the service quality reduction is further suppressible.

When the measured value of the line speed is adopted as the communication quality value, even if the line speed is slow, a tendency that the service communication quality is reduced due to the communication load is suppressible. When the measured value of the latency is adopted as the communication quality value, even if the latency is large, a tendency that the service communication quality is reduced due to the communication load is also suppressible.

In addition, when the communication quality is determined based on both line speed and latency, there is an effect that it becomes possible to distinguish a case in which the line speed is fast but the latency is large and thus the overall communication quality is low, and, a case in which the latency is small but the line speed is slow and thus the overall communication quality is low.

In addition, according to the first embodiment, the communication apparatus includes the resource measuring unit 103 that periodically measures the communication resource available for the above data transfer, and the measurement-environment memory 107 further stores the measured resource value measured by the resource measuring unit 103. Moreover, the measurement-load controlling unit 109 changes the communication quality according to a change in value of the communication quality and also a change in value of the measured resource value.

As explained above, according to the first embodiment, in view of also an expected communication-quality when the communication resource is utilized, the communication load for communication-quality measurement is changed. Hence, it becomes possible for the controlling apparatus for communication-quality measuring to suppress beforehand the communication load for measurement which utilizes some of the communication bands, and to further suppress that the communication quality measurement through data transfer becomes a factor of reducing the service communication quality.

The resource measuring unit 103 includes, for example, the wireless-signal measuring unit 500, and the travelling-status measuring unit 502. The travelling-status measuring unit 502 is constructed by, for example, an acceleration sensor and a GPS.

Hence, the wireless signal that the communication apparatus 100 passively receives and the travel amount based on a positional change are taken into consideration as the measured resource values. This makes it possible for the controlling apparatus for communication-quality measuring to suppress beforehand the communication load for measurement which utilizes some of the communication bands according to an intensity change in wireless signal and a change in travelling status.

When a radio wave condition is not excellent, it is appropriate if the communication load to measure the communication quality is reduced beforehand, and when the travel amount largely changes, there is a possibility that the location where the user utilizes the communication apparatus greatly changes and the capability of catching radio wave changes, or there is a possibility that the user is travelling by car, and the capability of catching radio wave decreases, and thus it is appropriate if the communication load to measure the communication quality is reduced beforehand.

Still further, according to the first embodiment, the communication apparatus includes the service-communication measuring unit 105 that measures data transfer for a service, and this second kind data transfer is also adopted as the measured resource value. Hence, when data transfer for a prioritized service is being performed, it becomes possible to suppress or avoid the communication load for communication-quality measurement. Hence, it becomes possible to suppress that the data transfer for communication-quality measurement disturbs the service, and becomes a factor of reducing the communication quality.

When, for example, it is determined that data transfer for the prioritized service is being performed if the amount of second kind data transfer is larger than a predetermined value, the reduction of the service communication quality due to the communication load is suppressible.

Yet still further, according to the first embodiment, as illustrated in FIG. 5, data transfer to measure the line speed, and data transfer for a service other than the measurement of the line speed are carried out simultaneously. This enables a measurement of the communication quality up to the final communication destination which was difficult for communication-quality measuring methods in the physical layer.

Second Embodiment

Figure 19:
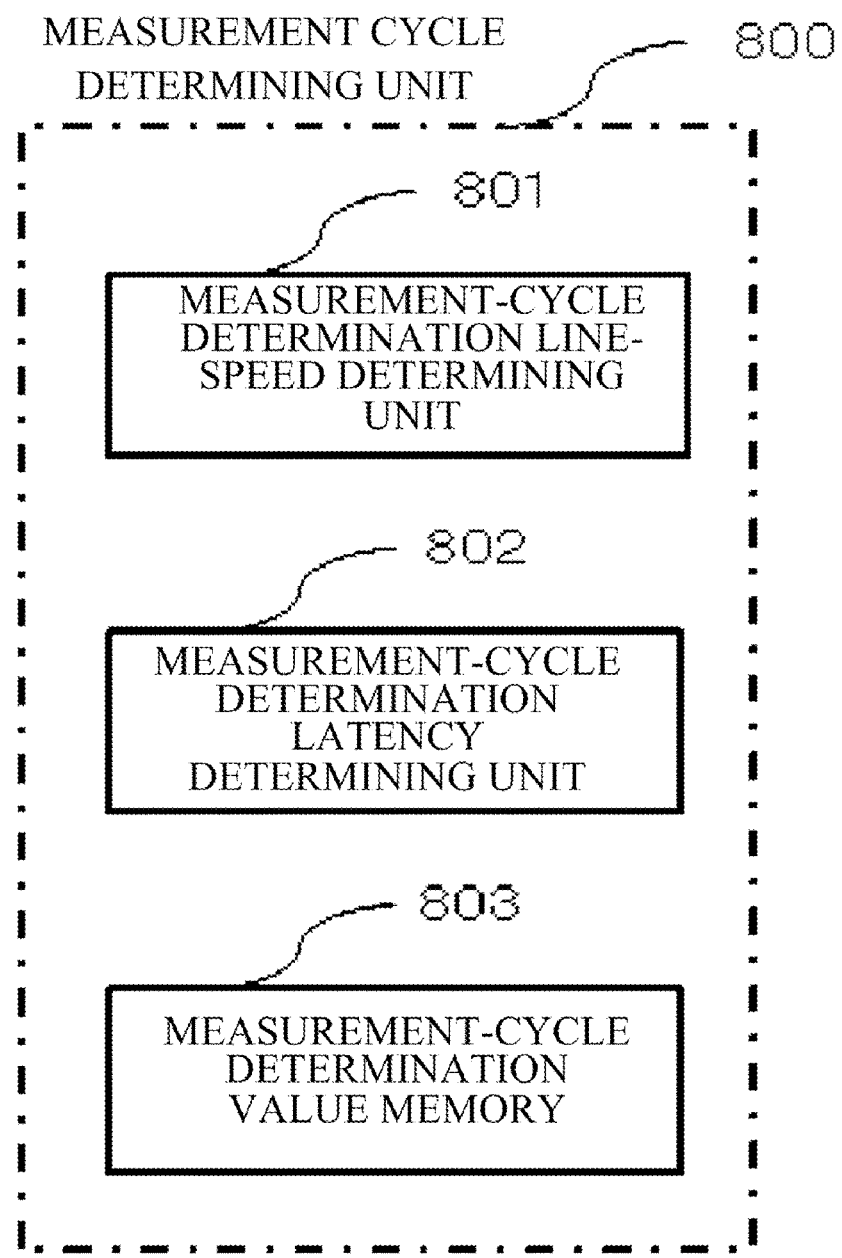
FIG. 19 is a schematic block diagram of a measurement cycle determining unit in the communication apparatus according to an embodiment of the present disclosure.

A second embodiment employs the same structure as that of the first embodiment except that the measurement cycle memory 210 of the first embodiment illustrated in FIG. 2 is replaced with a measurement-cycle determining unit 800 illustrated in FIG. 19.

As illustrated in FIG. 19, the measurement-cycle determining unit 800 includes a measurement-cycle determination line-speed determining unit 801, a measurement-cycle determination latency determining unit 802, and a measurement-cycle determination value memory 803.

The second embodiment is carried out through the same procedure as that of the first embodiment except that the step S43 of the first embodiment illustrated in FIG. 11 is replaced with a step S82 in which the controlling timer for communication-quality measuring 205 obtains a measurement cycle value TSU5 determined by the measurement-cycle determining unit 800.

Figure 20:
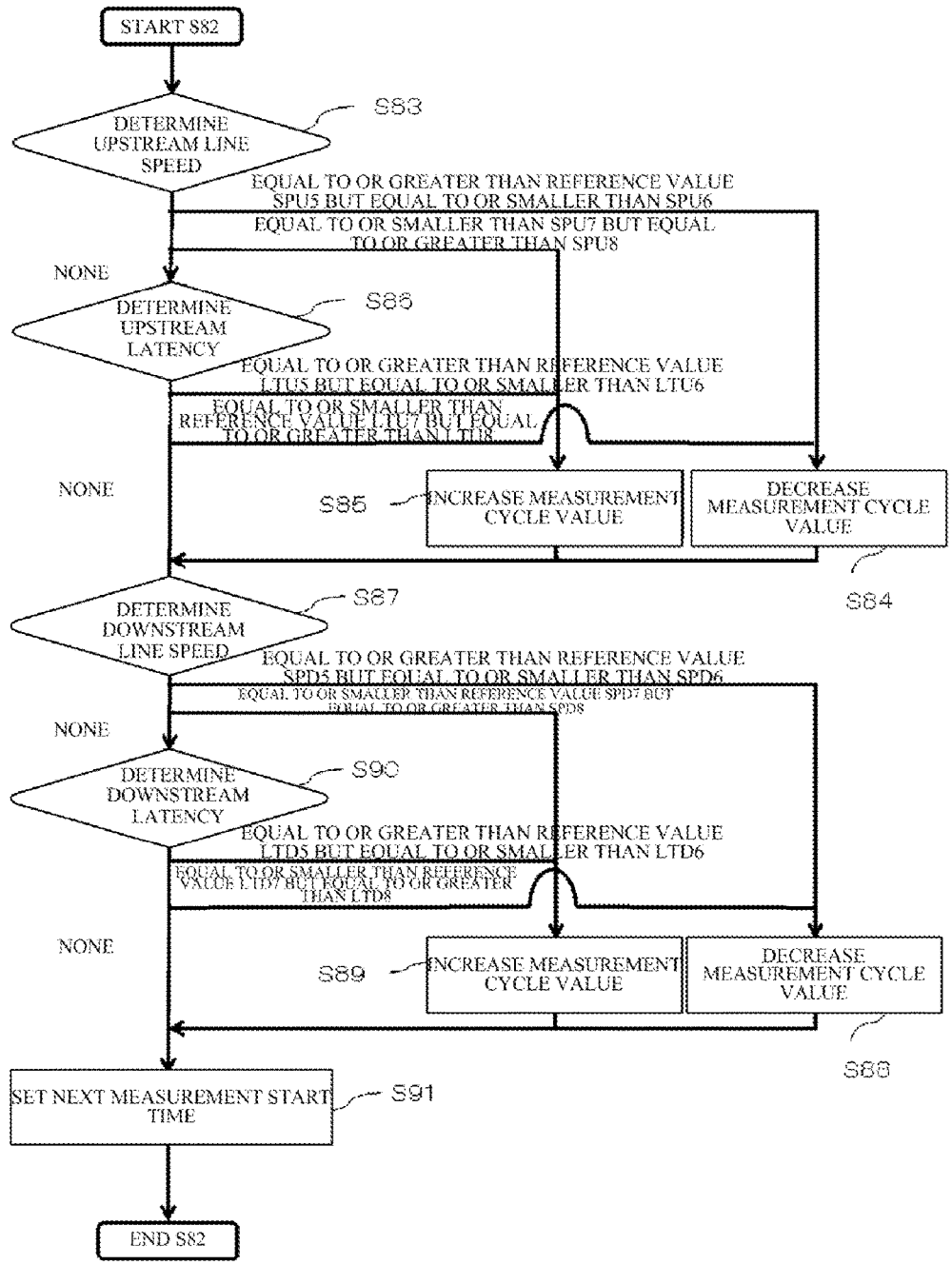
FIG. 20 is an example flowchart of an operation by the controlling apparatus for communication-quality measuring that adjusts the measurement cycle in the communication apparatus according to an embodiment of the present disclosure.

FIG. 20 is an example detailed flowchart of an operation in the step S82. An explanation will be given of an operation of, in the step S82, adjusting the measurement cycle based on respective upstream and downstream line speeds and latencies.

The measurement cycle value is increased or decreased based on the value of the upstream line speed in step S83. When the line speed is slow, in order to reduce the communication load, the measurement cycle value is increased to decrease the measurement repetition. Conversely, when the upstream line speed is fast, in order to more precisely measure the maximum communication quality, the measurement cycle value is decreased to increase the measurement repetition.

The process performed in the step S83 will be explained in more detail. The measurement-cycle determination line-speed determining unit 801 compares the value of the upstream line speed SPUN1 with a reference value. When SPUN1 is equal to or greater than a reference value SPU5 but is equal to or smaller than a reference value SPU6, the process progresses to step S84. When SPUN1 is equal to or smaller than a reference value SPU7 but is equal to or greater than a reference value SPU8, the process progresses to step S85. When none of the conditions is satisfied, the process directly progresses to step S86. In this case, SPU5 is a smaller value than SPU6, SPU7 is a smaller value than SPU5, and SPU8 is a smaller value than SPU7.

The measurement-cycle determining unit 800 obtains, from the measurement-cycle determination value memory 803, a current measurement cycle value TSUC1 in the step S84, and sets a new measurement cycle value TSUU1 obtained by subtracting a prescribed value TSUD1 from TSUC1. When, however, TSUU1 is smaller than a prescribed value TSUMIN, TSUMIN is set as the value of TSUU1. The value of TSUU1 is recorded in the measurement-cycle determination value memory 803 as the current measurement cycle value. Subsequently, the process progresses to step S87.

The measurement-cycle determining unit 800 obtains, from the measurement-cycle determination value memory 803, the current measurement cycle value TSUC1 in the step S85, and sets a new measurement cycle value TSUU2 obtained by adding a prescribed value TSUD2 to TSUC1. When, however, TSUU2 is larger than a prescribed value TSUMAX, TSUMAX is set as the value of TSUU2. The value of TSUU2 is recorded in the measurement-cycle determination value memory 803 as the current measurement cycle value. Subsequently, the process progresses to step S87. Note that the prescribed values TSUD1 and TSUD2 may be the same value or the different values.

The measurement cycle value is increased or decreased in step S86 based on the value of the upstream latency. When the upstream latency is large, the measurement cycle value is increased in order to reduce the communication load and to reduce the measurement repetition. When the upstream-latency is small, the measurement cycle value is decreased in order to increase the measurement repetition so as to more precisely measure the maximum communication quality.

The process performed in the step S86 will be explained in more detail. The measurement-cycle determination latency determining unit 802 compares the value of the upstream latency LTUN1 with a reference value. When LTUN1 is equal to or greater than a reference value LTU5 but is equal to or smaller than a reference value LTU6, the process progresses to the step S85. When LTUN1 is equal to or smaller than a reference value LTU7 but is equal to or greater than a reference value LTU8, the process progresses to the step S84. When none of the conditions is satisfied, the process directly progresses to step S87. In this case, LTU5 is a smaller value than LTU6, LTU7 is a smaller value than LTU5, and LTU8 is a smaller value than LTU7.

The measurement cycle value is increased or decreased in the step S87 based on the value of the downstream line speed. When the downstream line speed is slow, the measurement cycle value is increased in order to reduce the communication load and to reduce the measurement repetition. When the downstream line speed is fast, the measurement cycle value is decreased in order to increase the communication repetition and to more precisely measure the maximum communication quality.

The process performed in the step S87 will be explained in more detail. The measurement-cycle determination line-speed determining unit 801 compares the value of the downstream line speed SPDN1 with a reference value. When SPDN1 is equal to or greater than a reference value SPD5 but is equal to or smaller than a reference value SPD6, the process progresses to step S88. When SPDN1 is equal to or smaller than a reference value SPD7 but is equal to or greater than a reference value SPD8, the process progresses to step S89. When none of the conditions is satisfied, the process directly progresses to step S90. In this case, SPD5 is a smaller value than SPD6, SPD7 is a smaller value than SPD5, and SPD8 is a smaller value than SPD7.

The measurement-cycle determining unit 800 obtains, from the measurement-cycle determination value memory 803 in the step S88, a current measurement cycle value TSDC1, and sets a new measurement cycle value TSDU1 obtained by subtracting a prescribed value TSDD1 from TSDC1. When, however, TSDU1 is smaller than a prescribed value TSDMIN, TSDMIN is set as the value of TSDU1. The value of TSDU1 is recorded in the measurement-cycle determination value memory 803 as the current measurement cycle value. Subsequently, the process progresses to step S91.

The measurement-cycle determining unit 800 obtains, from the measurement-cycle determination value memory 803, the current measurement cycle value TSDC1 in the step S89, and sets a new measurement cycle value TSDU2 obtained by adding a prescribed value TSDD2 to TSDC1. When, however, TSDU2 is larger than a prescribed value TSDMAX, TSDMAX is set as the value of TSDU2. The value of TSDU2 is recorded in the measurement-cycle determination value memory 803 as the current measurement cycle value. Subsequently, the process progresses to the step S91. Note that the prescribed values TSDD1 and TSDD2 may be the same value or the different values.

The measurement cycle value is increased or decreased in the step S90 based on the value of the downstream latency. When the downstream latency is large, the measurement cycle value is increased in order to reduce the communication load and to reduce the measurement repetition. When the downstream latency is small, the measurement cycle value is decreased in order to increase the measurement repetition so as to more precisely measure the maximum communication quality.

The process performed in the step S90 will be explained in more detail. The measurement-cycle determination latency determining unit 802 compares the value of the downstream latency LTDN1 with a reference value. When LTDN1 is equal to or greater than a reference value LTD5 but is equal to or smaller than a reference value LTD6, the process progresses to the step S89. When LTDN1 is equal to or smaller than a reference value LTD7 but is equal to or greater than a reference value LTD8, the process progresses to the step S88. When none of the conditions is satisfied, the process directly progresses to the step S91. In this case, LTD5 is a smaller value than LTD6, LTD7 is a smaller value than LTD5, and LTD8 is a smaller value than LTD7.

The controlling timer for communication-quality measuring 205 sets the current time as a standby start time in the step S91. In addition, the value TSU5 recorded in the measurement-cycle determination value memory 803 as the current measurement cycle is obtained, and the next measurement start time obtained by adding TSU5 to the current time is set, and, the process in the step S82 is terminated.

Effect of Second Embodiment

According to the second embodiment, as the method of changing the communication load, the data transfer repetition is changed. According to this method, also, a tendency that the communication load for communication quality measurement decreases the service communication quality is suppressible.

Third Embodiment

A third embodiment employs the same operation as that of the first embodiment except that, in the operation of the first embodiment illustrated in FIG. 12, a determination on whether to increase or decrease the data size relative to upstream and downstream communication error occurrence rates is made based on the communication error occurrence rate that is an additional communication quality to the two factors which are the line speed and the latency in the first embodiment.

In the case of a UDP communication, it is difficult to determine, based on the line speed and the latency only, a reduction of the communication quality due to discarding of packets according to an occurrence of a communication error, but it becomes possible to determine the communication quality based on the communication error occurrence rate. In the case of a UDP communication, the check sum of received UDP packets is calculated, and when the calculation result differs from the check sum in a UDP header, it is determined that an error has occurred. In this case, the communication error occurrence rate is calculated as the rate of packets determined as error packets relative to the entire packets.

Figure 21:
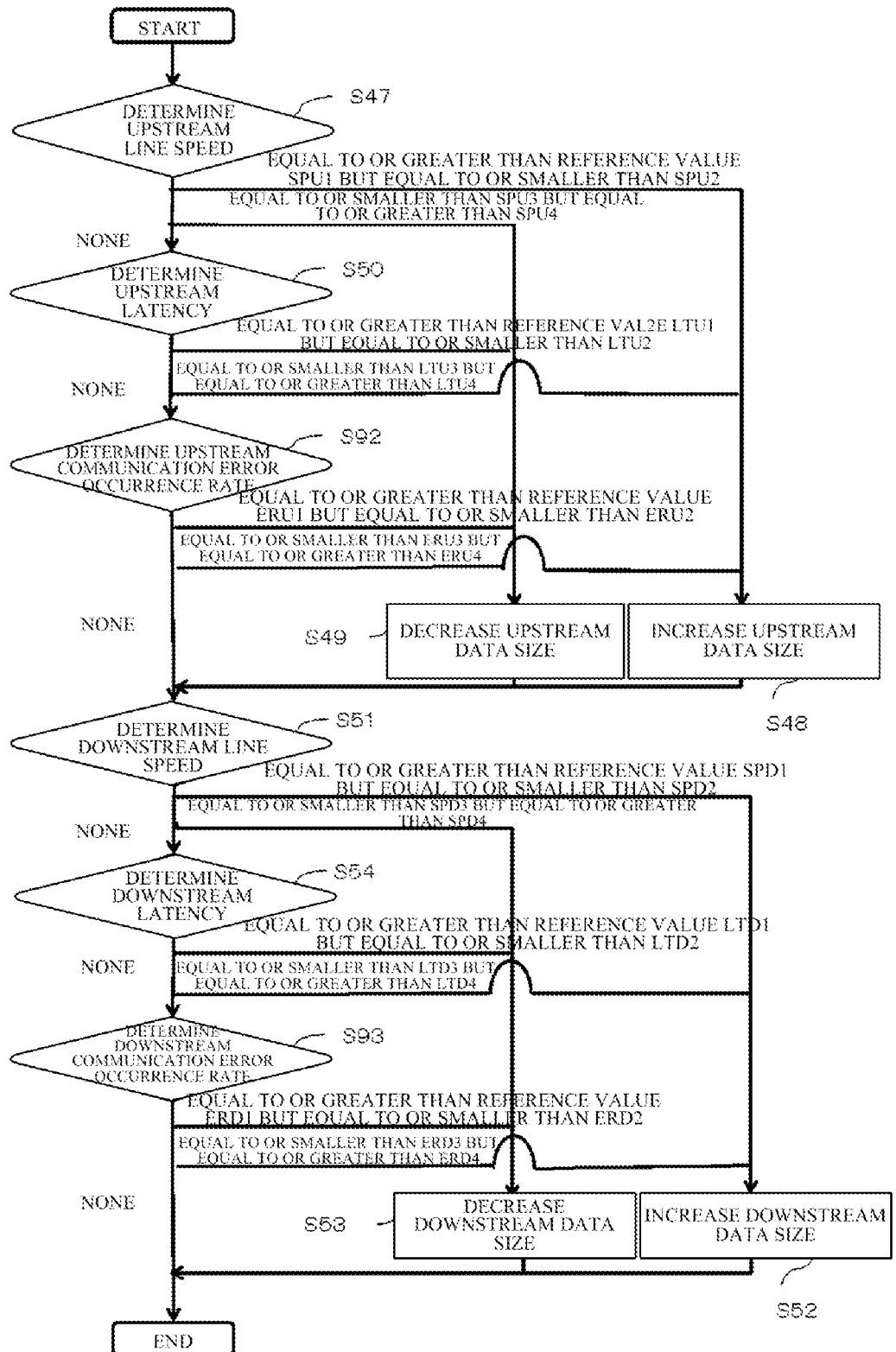
FIG. 21 is an example flowchart of an operation by the controlling apparatus for communication-quality measuring that adjusts a data size at the time of measurement according to a line speed, a latency, and a communication error occurrence rate in the communication apparatus according to an embodiment of the present disclosure.

FIG. 21 is an example flowchart of an operation according to the third embodiment in which, in addition to the operation of the first embodiment illustrated in FIG. 12, a determination on whether to increase or decrease the data size relative to the upstream and downstream communication error occurrence rates is additionally performed.

An upstream communication error occurrence rate ERUN1 is compared with a reference value in step S92. When ERUN1 is equal to or greater than a reference value ERU1 but is equal to or smaller than a reference value ERU2, the process progresses to the step S49 to decrease the data size for measurement. When ERUN1 is equal to or smaller than a reference value ERU3 but is equal to or greater than a reference value ERU4, the process progresses to the step S48 to increase the data size for measurement. When none of the conditions is satisfied, the process directly progresses to the step S51. In this case, ERU1 is a smaller value than ERU2, ERU3 is a smaller value than ERU1, and ERU4 is a smaller value than ERU3.

A downstream communication error occurrence rate ERDN1 is compared with a reference value in step S93. When ERDN1 is equal to or greater than a reference value ERD1 but is equal to or smaller than a reference value ERD2, the process progresses to the step S53 to decrease the data size for measurement. When ERDN1 is equal to or smaller than a reference value ERD3 but is equal to or greater than a reference value ERD4, the process progresses to the step S52 to increase the data size for measurement. When none of the conditions is satisfied, the process is directly terminated. In this case, ERD1 is a smaller value than ERD2, ERD3 is a smaller value than ERD1, and ERD4 is a smaller value than ERD3.

Effect of Third Embodiment

According to the third embodiment of the present disclosure, as the method of changing the communication load, the data size for the data transfer is changed through the operation illustrated in the flowchart of FIG. 21. Hence, a tendency that the service communication quality is reduced due to the communication load is suppressible.

REFERENCE SIGNS LIST

100 Communication apparatus
102 Controlling apparatus for communication-quality measuring
104 Service communication unit
105 Service-communication measuring unit
107 Measurement-environment memory
108 Measurement-environment monitor
109 Measurement-load controlling unit
110 Control signal
200 Upstream communication-quality measuring unit
201 Downstream communication-quality measuring unit
202 Upstream communication-quality measuring server unit
203 Downstream communication-quality measuring server unit
204 Measurement-load-determination-rule memory
205 Controlling timer for Communication-quality measuring
206 Data-size determining unit
207 Line-speed determining unit
208 Latency determining unit
209 Data-size memory
210 Measurement-cycle memory
211 Measurement-environment transmitting unit
212 Service-communication measured-value receiving unit
213 Measured-resource-value receiving unit
214 Service communication server unit
300 Upstream measurement-data creating unit 301 Upstream measurement-data transmitting unit
302 Upstream response-data receiving unit
303 Upstream communication-quality determining unit
304 Upstream data temporal memory
305 Upstream measurement-data receiving unit
306 Upstream measurement-data creating unit
307 Upstream response-data transmitting unit
400 Downstream measurement-data-size transmitting unit
401 Downstream measurement-data-size receiving unit
402 Downstream response-data creating unit
403 Downstream response-data transmitting unit
404 Downstream communication-quality measurement-result receiving unit
405 Downstream measurement-data-size receiving unit
406 Downstream data-size memory
407 Downstream measurement-data creating unit
408 Downstream measurement-data transmitting unit
409 Downstream data temporal memory
410 Downstream response-data receiving unit
411 Downstream communication-quality determining unit
412 Downstream communication-quality measurement-result transmitting unit
500 Wireless-signal measuring unit
501 Wireless-signal-quality transmitting unit
502 Travelling-status measuring unit
503 Acceleration sensor
504 GPS
505 Travelling-amount transmitting unit
600 Communication-quality receiving unit
601 QoS controlling unit
602 Prioritized-service-speed determining unit
603 Upstream prioritized-service transmitting unit
604 Downstream prioritized-service receiving unit
605 Normal-service-speed determining unit
606 Upstream normal-service transmitting unit
607 Downstream normal-service receiving server unit
608 Upstream-service receiving server unit
609 Downstream-service transmitting server unit
700 Sound input device
701 Sound input detecting unit
702 Sound condition transmitting unit
703 Sound output device
704 Sound output detecting unit
801 Measurement-cycle determination line-speed determining unit
802 Measurement-cycle determination latency determining unit
803 Measurement-cycle determination value memory

The invention claimed is:

1. A communication apparatus comprising:
a service communication unit performing wireless data transfer;
a communication-quality measuring unit measuring a communication quality value of the service communication unit by making a communication load with the wireless data transfer at a predetermined repetition;
a resource measuring unit periodically measuring a communication resource value available for the wireless data transfer;
a measurement-environment memory storing the communication quality value and the communication resource value;
a measurement-environment monitor monitoring a change in the communication quality value stored in the measurement-environment memory; and
a measurement-load controlling unit changing the communication load according to the change in the communication quality value and the communication resource value,
wherein:
the resource measuring unit comprises a wireless-signal measuring unit measuring a quality of a wireless signal transmitted and received by the service communication unit,
when the quality of the wireless signal is lower than a predetermined value, the measurement-load controlling unit performs a control so as to reduce the communication load;
the resource measuring unit comprises a travelling-status measuring unit detecting a travelling speed concerning movement of the communication apparatus, and
when the travelling speed is larger than a predetermined value, the measurement-load controlling unit performs a control so as to reduce the communication load,
the communication quality value includes a measured value of a line speed;
the communication-quality measuring unit:
has a measurement target that is a network connecting the communication apparatus with a connection-destination communication apparatus;
simultaneously carries out first wireless data transfer for a purpose of a measurement of the line speed, and a second wireless data transfer for a purpose of a service other than the measurement of the line speed through the network;
performs the first wireless data transfer for the purpose of the measurement of the line speed at least twice;
transmits, from the communication apparatus to the connection-destination communication apparatus in the first wireless data transfer, first measurement data at a time T1, the first measurement data comprising a communication header with a data size that is H byte and a payload with a data size that is 0 byte, the connection-destination communication apparatus transmitting a response data of R byte to the communication apparatus upon receiving all pieces of transmitted data, and, obtains a time T obtained by subtracting the time T1 from a time T2 at which the communication apparatus receives all pieces of response data; and
transmits, from the communication apparatus to the connection-destination communication apparatus a subsequent wireless data transfer, second measurement data at a time t1, the second measurement data comprising a communication header with a data size that is H byte and a payload with a data size that is P byte, the connection-destination communication apparatus transmitting a response data of R byte to the communication apparatus upon receiving all pieces of transmitted data, and, obtains a time t obtained by subtracting the time t1 from a time t2 at which the communication apparatus receives all pieces of response data;

a time T is the time needed to transfer wireless data of S1 byte for a service simultaneously with pieces of data of H byte, 0 byte, and R byte over the network;

a time t is the time needed to transfer wireless data of S2 byte for a service simultaneously with pieces of data of H byte, P byte, and R byte over the network; and based on an assumption that wireless data transfer amount for a service from a start of the measurement to an end of the measurement is constant and S1 byte and S2 byte are equal, a time U needed to perform wireless data transfer of the payload of P byte only is approximated as a value obtained by subtracting the time T from the time t, and the line speed at a time of the subsequent wireless data transfer is obtained by dividing the P byte by the time U.

2. The communication apparatus according to claim 1, wherein:
the travelling-status measuring unit comprises an acceleration sensor; and
an amount concerning movement includes an acceleration value indicated by the acceleration sensor.

3. The communication apparatus according to claim 1, wherein:
the travelling-status measuring unit comprises a GPS; and
an amount concerning movement includes an amount of change in a GPS coordinate.

4. The communication apparatus according to claim 1, further comprising a service communication unit performing a second kind of wireless data transfer different from the wireless data transfer, wherein:
the resource measuring unit comprises a service-communication measuring unit measuring an amount of the second kind of wireless data transfer; and
a measured resource value obtained from the resource measuring unit includes the second kind of wireless data transfer amount.

5. The communication apparatus according to claim 4, wherein when the second kind of wireless data transfer amount is larger than a predetermined value, the measurement-load controlling unit performs a control so as to reduce the communication load.

6. A non-transitory computer readable medium storing a program causing a computer to function as:
causing a service communication unit to perform wireless data transfer;
causing a communication-quality measuring unit to measure a communication quality value of the service communication unit by making a communication load with the wireless data transfer at a predetermined repetition;
causing a resource measuring unit to periodically measure a communication resource value available for the wireless data transfer;
causing a measurement-environment memory to store the communication quality value and the communication resource value;
causing a measurement-environment monitor to monitor a change in the communication quality value stored in the measurement-environment memory; and
causing a measurement-load controlling unit to change the communication load according to the change in the communication quality value and the communication resource value;

wherein:
the resource measuring unit comprises a wireless-signal measuring unit measuring a quality of the wireless signal transmitted and received by the service communication unit,
when the quality of the wireless signal is lower than a predetermined value, the measurement-load controlling unit performs a control so as to reduce the communication load,
the resource measuring unit comprises a travelling-status measuring unit detecting a travelling speed concerning movement of the communication apparatus, and
when the travelling speed is larger than a predetermined value, the measurement-load controlling unit performs a control so as to reduce the communication load,
the communication quality value includes a measured value of a line speed;
the communication-quality measuring unit:
has a measurement target that is a network connecting the communication apparatus with a connection-destination communication apparatus;
simultaneously carries out first wireless data transfer for a purpose of a measurement of the line speed, and a second wireless data transfer for a purpose of a service other than the measurement of the line speed through the network;
performs the first wireless data transfer for the purpose of the measurement of the line speed at least twice;
transmits, from the communication apparatus to the connection-destination communication apparatus in the first wireless data transfer, first measurement data at a time T1, the first measurement data comprising a communication header with a data size that is H byte and a payload with a data size that is 0 byte, the connection-destination communication apparatus transmitting a response data of R byte to the communication apparatus upon receiving all pieces of transmitted data, and, obtains a time T obtained by subtracting the time T1 from a time T2 at which the communication apparatus receives all pieces of response data; and
transmits, from the communication apparatus to the connection-destination communication apparatus in a subsequent wireless data transfer, second measurement data at a time t1, the second measurement data comprising a communication header with a data size that is H byte and a payload with a data size that is P byte, the connection-destination communication apparatus transmitting a response data of R byte to the communication apparatus upon receiving all pieces of transmitted data, and, obtains a time t obtained by subtracting the time t1 from a time t2 at which the communication apparatus receives all pieces of response data;
a time T is the time needed to transfer data of S1 byte for a service simultaneously with pieces of data of H byte, 0 byte, and R byte over the network;
a time t is the time needed to transfer data of S2 byte for a service simultaneously with pieces of data of H byte, P byte, and R byte over the network; and
based on an assumption that wireless data transfer amount for a service from a start of the measurement to an end of the measurement is constant and S1 byte and S2 byte are equal, a time U needed to perform wireless data transfer of the payload of P byte only is approximated as a value obtained by subtracting the time T from the time t, and the line speed at a time of the subsequent wireless data transfer is obtained by dividing the P byte by the time U.

7. A controlling apparatus for communication-quality measuring comprising:
a communication-quality measuring unit measuring a communication quality value of a communication apparatus by making a communication load with wireless data transfer at a predetermined repetition;
a measurement-environment memory storing the communication quality value;
a measurement-environment monitor monitoring a change in the communication quality value stored in the measurement-environment memory;
a measurement-load controlling unit changing the communication load according to the change in the communication quality value; and
a resource measuring unit periodically measuring a communication resource value available for the wireless data transfer, wherein:
the measurement-environment memory further stores the communication resource value measured by the resource measuring unit, and
the measurement-load controlling unit changes the communication load according to the change in the communication quality value and a change in the measured resource value, and the communication quality value includes a measured value of a line speed, the communication-quality measuring unit:
has a measurement target that is a network connecting the communication apparatus with a connection-destination communication apparatus,
simultaneously carries out first wireless data transfer for a purpose of a measurement of the line speed, and a second wireless data transfer for a purpose of a service other than the measurement of the line speed through the network,
performs the first wireless data transfer for the purpose of the measurement of the line speed at least twice,
causes a communication device to transmit, from the communication apparatus to the connection-destination communication apparatus in the first wireless data transfer, first measurement data at a time T1, the first measurement data comprising a communication header with a data size that is H byte and a payload with a data size that is 0 byte, the connection-destination communication apparatus transmitting a response data of R byte to the communication apparatus upon receiving all pieces of transmitted data, and, obtains a time T obtained by subtracting the time T1 from a time T2 at which the communication apparatus receives all pieces of response data, and
causes the communication device to transmit, from the communication apparatus to the connection-destination communication apparatus in a subsequent wireless data transfer, second measurement data at a time t1, the second measurement data comprising a communication header with a data size that is H byte and a payload with a data size that is P byte, the connection-destination communication apparatus transmitting a response data of R byte to the communication apparatus upon receiving all pieces of transmitted data, and, obtains a time t obtained by subtracting the time t1 from a time t2 at which the communication apparatus receives all pieces of response data, wherein
a time T is the time needed to transfer data of S1 byte for a service simultaneously with pieces of data of H byte, 0 byte, and R byte over the network,
a time t is the time needed to transfer data of S2 byte for a service simultaneously with pieces of data of H byte, P byte, and R byte over the network, and
based on an assumption that wireless data transfer amount for a service from a start of the measurement to an end of the measurement is constant and S1 byte and S2 byte are equal, a time U needed to perform wireless data transfer of the payload of P byte only is approximated as a value obtained by subtracting the time T from the time t, and the line speed at a time of the subsequent wireless data transfer is obtained by dividing the P byte by the time U.

8. A communication apparatus comprising:
a service communication unit performing wireless data transfer;
a communication-quality measuring unit measuring a communication quality value of the service communication unit by making a communication load with the wireless data transfer at a predetermined repetition;
a resource measuring unit periodically measuring a communication resource value available for the wireless data transfer;
a measurement-environment memory storing the communication quality value and the communication resource value;
a measurement-environment monitor monitoring a change in the communication quality value stored in the measurement-environment memory; and
a measurement-load controlling unit changing the communication load according to the change in the communication quality value and the communication resource value,
wherein:
the resource measuring unit comprises a wireless-signal measuring unit measuring a quality of a wireless signal transmitted and received by the service communication unit,
when the quality of the wireless signal is lower than a predetermined value, the measurement-load controlling unit performs a control so as to reduce the communication load;
the resource measuring unit comprises a travelling-status measuring unit detecting a travelling speed concerning movement of the communication apparatus, and
when the travelling speed is larger than a predetermined value, the measurement-load controlling unit performs a control so as to reduce the communication load, the communication quality value includes a measured value of a line speed;
the communication-quality measuring unit:
has a measurement target that is a network connecting the communication apparatus with a connection-destination communication apparatus;
simultaneously carries out first wireless data transfer for a purpose of a measurement of the line speed, and for a purpose of a service other than the measurement of the line speed through the network;

performs the first wireless data transfer for the purpose of the measurement of the line speed at least twice;

transmits, from the communication apparatus to the connection-destination communication apparatus in the first wireless data transfer, first measurement data at a time T1, the first measurement data comprising a communication header with a data size that is H byte and a payload with a data size that is 0 byte, the connection-destination communication apparatus transmitting a response data of R byte to the communication apparatus upon receiving all pieces of transmitted data, and, obtains a time T obtained by subtracting the time T1 from a time T2 at which the communication apparatus receives all pieces of response data; and transmits, from the communication apparatus to the connection-destination communication apparatus in a subsequent wireless data transfer, second measurement data at a time t1, the second measurement data comprising a communication header with a data size that is H byte and a payload with a data size that is P byte, the connection-destination communication apparatus transmitting a response data of R byte to the communication apparatus upon receiving all pieces of transmitted data, and, obtains a time t obtained by subtracting the time t1 from a time t2 at which the communication apparatus receives all pieces of response data;

a time T is the time needed to transfer wireless data of S1 byte for a service simultaneously with pieces of data of H byte, 0 byte, and R byte over the network;

a time t is the time needed to transfer wireless data of S2 byte for a service simultaneously with pieces of data of H byte, P byte, and R byte over the network; and based on an assumption that wireless data transfer amount for a service from a start of the measurement to an end of the measurement is constant and S1 byte and S2 byte are equal, a time U needed to perform wireless data transfer of the payload of P byte only is approximated as a value obtained by subtracting the time T from the time t, and the line speed at a time of the subsequent wireless data transfer is obtained by dividing the P byte by the time U.

9. The communication apparatus according to claim 8, wherein:

the travelling-status measuring unit comprises an acceleration sensor; and an amount concerning movement includes an acceleration value indicated by the acceleration sensor.

10. The communication apparatus according to claim 8, wherein:

the travelling-status measuring unit comprises a GPS; and an amount concerning movement includes an amount of change in a GPS coordinate.

11. The communication apparatus according to claim 8, further comprising a service communication unit performing a second kind of wireless data transfer different from the wireless data transfer, wherein:

the resource measuring unit comprises a service-communication measuring unit measuring an amount of the second kind of wireless data transfer; and a measured resource value obtained from the resource measuring unit includes the second kind of wireless data transfer amount.

12. The communication apparatus according to claim 11, wherein when the second kind of wireless data transfer amount is larger than a predetermined value, the measurement-load controlling unit performs a control so as to reduce the communication load.

* * * * *